(12) United States Patent  
Chae et al.

(10) Patent No.: US 12,395,612 B2  
(45) Date of Patent: Aug. 19, 2025

(54) PROJECTOR AND CONTROL METHOD THEREFOR

(71) Applicant: SAMSUNG ELECTRONICS CO., LTD., Suwon-si (KR)

(72) Inventors: Sungho Chae, Suwon-si (KR); Seungil Yoon, Suwon-si (KR); Hyunkyu Yun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 167 days.

(21) Appl. No.: 17/972,891

(22) Filed: Oct. 25, 2022

(65) Prior Publication Data

US 2023/0040505 A1 Feb. 9, 2023

Related U.S. Application Data

(63) Continuation of application No. PCT/KR2021/007850, filed on Jun. 23, 2021.

(30) Foreign Application Priority Data

Jul. 30, 2020 (KR) .......................... 10-2020-0094952

(51) Int. Cl.
*H04N 9/31* (2006.01)
*G03B 21/14* (2006.01)

(52) U.S. Cl.
CPC ......... *H04N 9/3185* (2013.01); *G03B 21/147* (2013.01); *H04N 9/3141* (2013.01)

(58) Field of Classification Search
CPC .... G03B 21/00; G03B 21/005; G03B 21/006; G03B 21/28; G03B 21/145; G03B 21/147;

(Continued)

(56) References Cited

U.S. PATENT DOCUMENTS 6,520,647 B2 2/2003 Raskar
6,877,863 B2 4/2005 Wood et al.
(Continued)

FOREIGN PATENT DOCUMENTS

JP 8-201913 A 8/1996
JP 2005-136699 A 5/2005
(Continued)

OTHER PUBLICATIONS

International Search Report issued in International Application No. PCT/KR2021/007850 dated Sep. 28, 2021.

(Continued)

*Primary Examiner* — Sultan Chowdhury
(74) *Attorney, Agent, or Firm* — STAAS & HALSEY LLP

(57) ABSTRACT

A projector device comprises: an image projection unit for projecting a guide image including a plurality of first objects; a camera; and a processor for obtaining a captured image acquired by the camera, the captured image including a guide image projected through the image projection unit. The processor identifies first location information corresponding to a location of each of a plurality of first objects included in the obtained captured image, identifies second location information corresponding to a location of each of a plurality of second objects related to the plurality of first objects, respectively, on the basis of the obtained captured image, and acquires image correction information on the basis of the first location information and the second location information.

15 Claims, 25 Drawing Sheets

(58) Field of Classification Search
CPC .......... G03B 21/208; G06T 3/00; G06T 3/08;
G06T 3/053; G06T 3/147; H04N 9/3141;
H04N 9/3152; H04N 9/3185; H04N 9/3194
See application file for complete search history.

(56) References Cited

U.S. PATENT DOCUMENTS

| | | |
|---|---|---|
| 7,252,386 B2 | 8/2007 | Matsumoto |
| 7,347,564 B2 | 3/2008 | Matsumoto et al. |
| 7,470,029 B2 | 12/2008 | Kobayashi |
| 9,535,538 B2 | 1/2017 | Yagishita |
| 9,860,494 B2 | 1/2018 | Johnson et al. |
| 10,979,682 B2 | 4/2021 | Ichieda |
| 11,109,007 B2 | 8/2021 | Ichieda |
| 2005/0036117 A1 | 2/2005 | Kobayashi |
| 2005/0219472 A1 | 10/2005 | Matsumoto |
| 2006/0038962 A1 | 2/2006 | Matsumoto et al. |
| 2008/0218811 A1 | 9/2008 | Yeo |
| 2011/0241990 A1* | 10/2011 | Huang ................ G06F 3/03542 345/158 |
| 2013/0083058 A1* | 4/2013 | Yoshimura ............... H04N 5/74 345/629 |
| 2013/0342816 A1* | 12/2013 | Furui .................. G03B 21/147 353/121 |
| 2014/0253511 A1 | 9/2014 | Yagishita |
| 2017/0374331 A1 | 12/2017 | Liu et al. |
| 2018/0164670 A1* | 6/2018 | Kaji .................... H04N 9/3194 |
| 2019/0275426 A1* | 9/2019 | Ito ....................... A63F 13/525 |
| 2020/0007835 A1 | 1/2020 | Ichieda |
| 2020/0228767 A1 | 7/2020 | Ichieda |
| 2021/0176442 A1 | 6/2021 | Ichieda |

FOREIGN PATENT DOCUMENTS

| | | | |
|---|---|---|---|
| JP | 5541679 | B2 | 7/2014 |
| JP | 6075122 | B2 | 2/2017 |
| JP | 2020-005095 | A | 1/2020 |
| JP | 2020-112711 | A | 7/2020 |
| KR | 10-2005-0009163 | A | 1/2005 |
| KR | 10-0618177 | B1 | 8/2006 |
| KR | 10-0643406 | B1 | 11/2006 |
| KR | 10-0739824 | B1 | 7/2007 |
| KR | 10-0812997 | B1 | 3/2008 |
| KR | 10-2009-0000777 | A | 1/2009 |
| KR | 10-1102953 | B1 | 1/2012 |
| KR | 10-2019-0063593 | A | 6/2019 |

OTHER PUBLICATIONS

International Written Opinion issued in PCT/KR2021/007850 dated Sep. 28, 2021.
Office Action dated Jun. 29, 2024 issued in Korean Patent Application No. 10-2020-0094952.
Notice of Final Rejection issued Feb. 27, 2025 for Application No. 10-2020-0094952.
Notice of Final Rejection dated Jun. 18, 2025 for Korean Application No. 10-2020-0094952.

* cited by examiner

PROJECTOR AND CONTROL METHOD THEREFOR

CROSS-REFERENCE TO RELATED APPLICATIONS

This application is a continuation application, under 35 U.S.C. § 111(a), of International Patent Application No. PCT/KR2021/007850, filed on Jun. 23, 2021, which claims the benefit of Korean Patent Application No. 10-2020-0094952, filed on Jul. 30, 2020, in the Korean Intellectual Property Office, the entire disclosures of each of which are incorporated herein by reference as a part of this application.

BACKGROUND

Field

The disclosure relates to a projector and control method therefor, and more particularly, to a projector and control method therefor that projects an input image.

Description of Related Art

Due to a relative location and direction between a projector and a screen, etc., an image projected onto the screen may be distorted, and thus, may not have a rectangular shape. In order to solve this problem, a keystone correction operation may be required. The keystone correction operation may be a technique for enabling a rectangular image to be projected by adjusting a physical location and direction of a projector or adjusting a projected image.

Meanwhile, due to hardware characteristics of an ultra-short throw projector, severe image distortion may occur even with a small change in an installation location, so the keystone correction technique may be essential.

A keystone correction method may be largely divided into manual keystone correction and automatic keystone correction. The manual keystone correction may be a method in which a user changes an image little by little using a remote control, a projector button, or the like to manipulate the image until distortion disappears, and the automatic keystone correction may be a method of automatically correcting distortion without significant user intervention. In general, the automatic keystone correction includes a method using a distance sensor and a method using a camera. A typical distance sensor method may correct distortion by measuring a distance between a projector and a screen in several directions and predicting a relative location and direction between the screen and the projector. The method using a camera may be a method of finding an edge boundary of a projected image and an edge of a screen within a captured image and correcting the found edge boundary and edge using the relationship between two rectangles. An ultra-short throw projector has a problem in that it is difficult to apply an automatic keystone correction technique due to hardware limitations.

The distance sensor-based method requires a device for physically changing the installation location and direction of the projector, but it may be difficult to implement with high accuracy in the ultra-short throw projector that may cause severe distortion even with a slight location correction. Since the distance between the screen and the projector is very close as well as the projected image is very large, and therefore, the projected image and the screen may not be captured by a normal camera, the camera-based method may require a wide-angle camera of 160° or more. In addition, there may be a problem in that the camera-based type is difficult to find the edge boundary and the screen edge of the accurately projected image, and cannot perform the keystone correction when projecting an image to a wall or the like without using the screen. Due to these problems, the manual keystone correction may be used for the ultra short throw projector. When manually performing the keystone correction using the remote control, the projector button, or the like, it takes a lot of time to correct the entire image because a part of the image is changed with a single input. In addition, there is a problem in that it is difficult to acquire a projected image with high correction performance because correction of a part of the image may affect other regions that have already been corrected.

SUMMARY

According to an embodiment of the disclosure, a projector includes: an image projection unit configured to project a guide image including a plurality of first objects; a camera; and a processor configured to obtain a captured image acquired by the camera, the captured image including the guide image projected through the image projection unit, identify first location information corresponding to locations of each of the plurality of first objects included in the obtained captured image, identify second location information corresponding to locations of a plurality of second objects related to each of the plurality of first objects based on the obtained captured image, and acquire image correction information based on the first location information and the second location information.

The captured image may include the plurality of second objects, and the processor may identify the second location information corresponding to the locations of the plurality of second objects included in the obtained captured image.

The processor may identify the locations of the plurality of second objects based on the first location information of each of the plurality of first objects, and identify the second location information based on the identified locations.

The guide image may be an image related to a polygonal shape, and the plurality of first objects may be a plurality of point objects included in the image related to the polygonal shape.

The image correction information may include a conversion function to convert an input image into an output image, and the processor may control the image projection unit to convert the input image into the output image based on the conversion function and project the output image.

The processor may correct the captured image based on a degree of distortion of the captured image, and identify the first location information based on the corrected captured image.

The plurality of second objects may be objects corresponding to a part of a user's body, and the processor may identify the second location information corresponding to the locations of the plurality of second objects when the plurality of identified second objects in the obtained captured image are identified at a same location for equal to or greater than a critical time.

When the first location information and the second location information are identified by the preset number in the captured image, the processor may acquire the image correction information based on the identified first location information and the identified second location information.

When a preset number of second location information is unidentified for a critical time in the captured image, the processor may control the image projection unit to project information guiding a preset number of second objects to be included in the captured image.

The image projection unit may include: a light source lamp configured to output a signal corresponding to the guide image including the plurality of first objects; and a lens configured to project the guide image based on the signal output from the light source lamp.

According to another embodiment of the disclosure, a method of controlling a projector includes: projecting a guide image including a plurality of first objects; obtaining a captured image including the projected guide image; identifying first location information corresponding to locations of each of the plurality of first objects included in the obtained captured image; identifying second location information corresponding to locations of a plurality of second objects related to each of the plurality of first objects based on the obtained captured image; and acquiring image correction information based on the first location information and the second location information.

The captured image may include the plurality of second objects, and in the identifying of the second location information, the second location information corresponding to the locations of the plurality of second objects included in the obtained captured image may be identified.

In the identifying of the second location information, the locations of the plurality of second objects may be identified based on the first location information of each of the plurality of first objects, and the second location information may be identified based on the identified locations.

The guide image may be an image related to a polygonal shape, and the plurality of first objects may be a plurality of point objects included in the image related to the polygonal shape.

The image correction information may include a conversion function for converting an input image into an output image, and the control method may further include converting an input image into an output image based on the conversion function and projecting the output image.

The control method may further include correcting the captured image based on the degree of distortion of the captured image, and in the identifying of the first location information, the first location information may be identified based on the corrected captured image.

The plurality of second objects may be objects corresponding to a part of a user's body, and in the identifying of the second location information, when the plurality of identified second objects in the obtained captured image are identified at the same location for a critical time or more, the identified location may be identified as the second location information.

In the identifying of the second location information, when the first location information and the second location information are identified by the preset number in the captured image, the image correction information may be obtained based on the identified first location information and the identified second location information.

When the preset number of second location information is not identified for a critical time in the captured image, the control method may further include projecting information guiding the preset number of second objects to be included in the captured image.

The image projection unit may further include: outputting a signal corresponding to the guide image including the plurality of first objects through the light source lamp; and projecting the guide image based on the signal output from the light source lamp through the lens.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
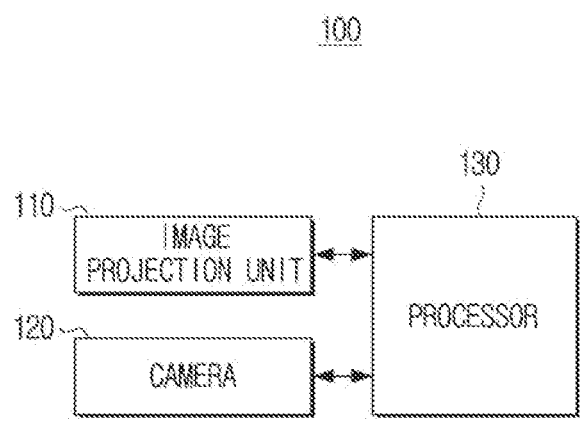
FIG. 1 is a block diagram illustrating a projector according to an embodiment of the disclosure.

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B".

Expressions "first", "second", '1st" or "2nd" or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In the disclosure, a "module" or a "~er/or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware.

In the disclosure, the term "user" may refer to a person using an electronic device or a device (for example, an artificial intelligence electronic device) using an electronic device.

The disclosure provides a projector for acquiring image correction information based on a guide image and for converting and then projecting an image based on the acquired image correction information, and a method of controlling the same.

Hereinafter, an embodiment of the disclosure will be described in detail with reference to the accompanying drawings.

FIG. 1 is a block diagram illustrating a projector according to an embodiment of the disclosure.

Referring to FIG. 1, a projector 100 may include an image projection unit 110, a camera 120, and a processor 130.

The projector 100 may refer to an image electronic device that projects an image. Specifically, the projector 100 may be an optical device that enlarges and projects input image data onto a screen (or wall).

The image projection unit 110 may include a light source lamp (not illustrated) and a lens (not illustrated). The light source lamp may refer to an element outputting light. Light output from the light source lamp may be projected onto a screen (or a wall) through a lens.

The camera 120 is configured to generate a captured image by capturing a subject, in which the captured image is a concept including both a moving image and a still image. The camera 120 may acquire an image of at least one external device, and may be implemented as a camera, a lens, an infrared sensor, or the like.

The camera 120 may include a lens and an image sensor. A type of lens includes a general general-purpose lens, a wide-angle lens, a zoom lens, and the like, and may be determined according to the type, characteristic, use environment, and the like of the projector 100. As the image sensor, a complementary metal oxide semiconductor (CMOS), a charge coupled device (CCD), and the like may be used.

The camera 120 outputs the incident light as an image signal. Specifically, the camera 120 may include a lens, a pixel, and an AD converter. The lens may collect light of a subject to form an optical image on a capturing area, and the pixel may output light incident through the lens as an analog image signal. In addition, an AD converter may convert the analog image signal into a digital image signal and output the digital image signal. In particular, the camera 120 may be arranged to capture a front direction of the projector 100, and may generate a captured image by capturing a user existing in front of the projector 100.

Meanwhile, in the description of the projector 100 according to the embodiment of the disclosure, a single camera 120 is described, but in actual implementation, a plurality of cameras may be arranged. The projector 100 may include a plurality of cameras, and may identify a user's head posture by combining images received through the plurality of cameras. When a plurality of cameras are used instead of using a single camera, a three-dimensional movement may be analyzed more precisely, which may be effective in identifying the user's head posture.

The processor 130 may perform an overall control operation of the projector 100. Specifically, the processor 130 may serve to control the overall operation of the projector 100.

The processor 130 may be implemented by a digital signal processor (DSP), a microprocessor, or a time controller (TCON) that processes a digital signal. However, the processor 130 is not limited thereto, but may include one or more of a central processing unit (CPU), a micro controller unit (MCU), a micro processing unit (MPU), a controller, an application processor (AP), a graphics-processing unit (GPU), a communication processor (CP), and an ARM processor, or may be defined by these terms. In addition, the processor 130 may be implemented by a system-on-chip (SoC) or a large scale integration (LSI) in which a processing algorithm is embedded, or may be implemented in the form of a field programmable gate array (FPGA). In addition, the processor 130 may perform various functions by executing computer executable instructions stored in the memory.

To accomplish the above-described object, the projector 100 according to the present embodiment includes: an image projection unit 110 configured to project a guide image including a plurality of first objects; a camera 120; and a processor 130 configured to acquire a captured image including the guide image projected through the image projection unit 110, identify first location information corresponding to locations of each of the plurality of first objects included in the acquired captured image, identify second location information corresponding to locations of a plurality of second objects related to each of the plurality of first objects based on the acquired captured image, and acquire image correction information based on the first location information and the second location information.

Here, the first object may refer to a first type of guide object. The guide object may be an object for testing whether an arrangement location, an arrangement angle, output setting, and the like of the projector 100 are suitable by being included in the guide image. Accordingly, the guide image may also be an image for testing whether to provide an image suitable for a user. Accordingly, the guide object may be described as a test object, and the guide image may be described as a test image. Here, the number of first objects may be 0 or plural. In order to analyze the relationship between a plane of the image data itself and a projected plane, the first object may be a polygonal object 501 or at least four or more point objects 801-1 to 801-4.

Meanwhile, the processor 130 may project the guide image onto a target area through the image projection unit 110. Here, the target area may refer to an area onto which light output through the image projection unit 110 is projected. For example, the target area may be a screen or wall surface.

The image output through the image projection unit 110 may be displayed in the target area. Here, the processor 130 may capture a space for a capturing range of the camera 120 through the camera 120. The processor 130 may acquire the captured image for the captured space. Here, the captured image may include the guide image projected through the image projection unit 110.

The processor 130 may analyze the acquired captured image to identify locations of each of the first objects, and acquire first location information corresponding to the identified location.

According to an embodiment, when the first object has a rectangular shape (e.g., 301 in FIG. 3), the processor 130 may acquire the first location information based on a location corresponding to a corner of the first object. For example, the processor 130 may identify four pieces of first location information from a rectangular object.

According to another embodiment, when the first object has a polygonal shape, the processor 130 may acquire the first location information based on locations corresponding to respective corners of the first object. For example, the processor 130 may identify n pieces of first location information in an n-polygon object.

According to another embodiment, when the first object is a plurality of points (or point objects) (e.g., 811-1 to 811-4 in FIG. 8), the processor 130 may acquire the first location information based on the locations of each point. For example, the processor 130 may identify four pieces of first location information in the guide object made of four points.

Meanwhile, the processor 130 may identify the second location information corresponding to the second object based on the captured image. In addition, the processor 130 may acquire the image correction information based on the first location information and the second location information.

Here, the second object may be a reference object for keystone correction. Specifically, the second object may be an object used to calculate a function applied to the keystone correction together with the first object.

The correction keystone (or adjusting the keystone) may refer to an operation of correctly correcting (or adjusting) a distorted screen without physically moving the projector 100 itself The first object may be distorted due to various causes, as will be described later with reference to FIG. 8. Accordingly, the keystone correction may be performed based on an object without distortion. Specifically, the processor 130 may perform the keystone correction so that the projected image is free from distortion by analyzing a relationship for converting an object with distortion into an object without distortion.

The keystone correction may be performed by adjusting hardware. For example, the lens included in the camera 120 may be adjusted to adjust a magnification or a projection location, or may adjust brightness through an iris.

The keystone correction according to the embodiment of the disclosure may be performed by converting the input image itself. In order to change the input image itself, the processor 130 may use a conversion function H2. Specifically, the processor 130 may acquire an output image by applying a conversion function H2 to the input image, and may project the acquired output image.

Here, the conversion function H2 may be acquired based on the relationship between the first location information of the first object and the second location information of the second object.

Meanwhile, in the above description, it has been described that the first location information and the second location information are identified on a camera plane. However, according to the implementation example, the first location information and the second location information may be identified in the projector plane. For example, the projector 100 may convert a captured image into a converted image based on an inverse function $H1^{-1}$ of the conversion function H1. Here, the converted image may be an image corresponding to the projector plane. In addition, the projector 100 may identify the location information of the first object and the second location information of the second object in the converted image. In addition, the projector 100 may compare the location information of the first object and the second location information of the second object acquired from the projector plane. A description related thereto will be made later with reference to FIG. 10. The reason for acquiring the relationship between the first location information and the second location information in the projector plane, not the camera plane, is that the accuracy of the keystone correction may be improved by directly acquiring the relationship on the projector plane rather than directly acquiring the relationship on the camera plane. Since an original image is data corresponding to the projector plane, not the camera plane, the conversion function H2 for the keystone correction may also be acquired from the projector plane.

Meanwhile, although described herein as the camera plane and the projector plane, this is for convenience of description, and the camera plane may be described as the first plane and the projector plane may be described as the second plane.

Meanwhile, in the projected image, the first object may be displayed in a state in which the distortion has occurred. Here, the second object may be in the state in which the distortion does not occur.

According to an embodiment, the second object is a preset object, and the second object may be recognized by being captured by the camera 120. For example, a user may directly locate the second object on the projected image. In addition, the camera 120 may capture the second object, and the second object may be included in the captured image. Here, the processor 130 may determine whether the preset second object is included in the captured image. When the captured image includes the second object, the processor 130 may identify the second location information corresponding to the location of the second object. A detailed description related thereto will be made later with reference to FIGS. 9 and 13.

According to another embodiment, the second object may be a virtual object directly generated by the processor 130. For example, the processor 130 may determine a degree of distortion based on the first location information of the first object identified in the captured image. In addition, the processor 130 may acquire the second location information of the second object without distortion based on the first location information. The processor 130 may acquire the second location information of the second object without a separate behavior of a user. However, unlike an embodiment in which a preset second object is identified through the camera 120, when a projection angle of the projector 100 is misaligned, the corrected projected image may also be misaligned. However, since distortions in vertical and horizontal directions are corrected, a suitable projection image may be displayed when a user physically adjusts the projection angle of the projector 100.

Meanwhile, the captured image may include the plurality of second objects, and the processor 130 may identify the second location information corresponding to the locations of the plurality of second objects included in the acquired captured image.

According to the embodiment described above, the second object is a preset object, and the second object may be recognized by being captured by the camera 120. The second object may be included in the captured image, and the processor 130 may determine whether there is the second object in the acquired captured image. When there is the second object in the captured image, it is possible to acquire the location information (second location information) of the second object. Here, there may be a plurality of second objects, and there may also be plural pieces of second location information. The operation of identifying the second location information of the second object will be described later with reference to FIGS. 9 to 13.

Meanwhile, the processor 130 may identify the locations of the plurality of second objects based on the first location information of each of the plurality of first objects, and identify the second location information based on the identified locations.

According to another embodiment described above, the second object may be a virtual object directly generated by the processor 130. Accordingly, the processor 130 may acquire the second location information based on the first location information without directly recognizing the second object in the captured image captured by the camera 120. For example, the location of the second object without distortion may be automatically identified based on the first location information of the first object included in the distorted projection image. When there are four pieces of first location information, there may also be four pieces of second location information. When four pieces of second location information are connected, the second object may have a rectangular shape.

Meanwhile, the guide image may be an image related to a polygonal shape, and the plurality of first objects may be a plurality of point objects included in the image related to the polygonal shape.

The guide image may include a guide object, and the guide object may be an object related to a polygonal shape. The object related to the polygonal shape may refer to a polygonal object itself or an object in which the shape of the object is not a polygon but may be recognized as a polygon. For example, an object 1305 (guide member) of FIG. 13 may be a rectangular object itself. However, second objects 912-1 to 912-4 of FIG. 9 may be a four-point object and an object having a shape that may be recognized as a rectangle.

Meanwhile, the image correction information may include the conversion function H2 for converting the input image into the output image, and the processor 130 may control the image projection unit 110 to convert the input image into the output image based on the conversion function H2 and project the output image.

Here, the conversion function H2 may be a function used for keystone correction. That is, when the input image is projected as it is, the distortion may occur, but when the input image (output image) to which the conversion function H2 is applied is projected, the distortion may not occur. The conversion function H2 will be described later with reference to FIGS. 10, 15, 23, and 24.

Meanwhile, the processor 130 may correct the captured image based on the degree of distortion of the captured image, and identify the first location information based on the corrected captured image.

The distortion of the captured image may be caused by two causes. First, the distortion may occur depending on the shape of the camera lens. For example, when the camera lens is a wide-angle lens, an object included in an image may be displayed as curved distortion. Second, distortion may occur depending on the projection angle of the projector 100 itself, a camera focus, and a camera magnification. For example, distortion may occur in the projected image depending on the direction and angle in which the projector 100 is installed.

In order to solve the distortion caused by the first cause, the processor 130 may correct the captured image based on the degree of distortion. Here, the correction may be lens distortion correction. A lens correction function may be applied to correct the lens distortion. For example, the corrected image may be acquired by applying the lens correction function to the captured image. The lens distortion correction will be described later with reference to FIG. 4.

In order to solve the distortion caused by the second cause, the processor 130 may perform the keystone correction. Specifically, the keystone correction according to the embodiment of the disclosure may refer to an operation of acquiring the output image by applying the conversion function H2 to the input image. The keystone correction will be described later with reference to FIGS. 14 and 16.

Meanwhile, in order to distinguish the conversion function H1 used for plane shift and the conversion function H2 used for the keystone correction, the conversion function H1 used for the plane shift may be described as a first conversion function, and the conversion function H2 used for the keystone correction may be described as a second conversion function.

Meanwhile, the second object may be objects corresponding to a part of a user's body, and the processor 130 may identify the identified location as the second location information when the plurality of identified second objects in the acquired captured image are identified at the same location for a critical time or more.

According to another embodiment described above, the second object may be a virtual object directly generated by the processor 130. The user may directly locate the second object and the camera 120 may capture the located second object. Here, the second object may be a preset object and may correspond to a part of user's entity. For example, the second object may be a fist object. Accordingly, when the fist object is identified in the captured image, the processor 130 may identify a location corresponding to the fist object as the second location information. However, when the captured image is acquired in real time, the processor 130 may identify a continuous second object, so the second location information may be changed in real time. Accordingly, the processor 130 may analyze the captured image in real time, but when the second object is identified at the same location for a preset time (critical time), the processor 130 may identify the identified location as the second location information. For example, when the fist object is identified at a specific location for 3 seconds or longer, the location identified for 3 seconds or longer may be identified as the second location information. Similarly, the processor 130 may acquire the plurality pieces of second location information.

Meanwhile, when the first location information and the second location information are identified by the preset number in the captured image, the processor may acquire the image correction information based on the identified first location information and the identified second location information.

The processor 130 may identify the first location information of the first object and the second location information of the second object in the captured image. Here, the processor 130 may need a reference for when to identify the first location information and the second location information. The processor 130 may stop the operation of automatically identifying the location information when the first location information and the second location information are identified in the captured image by the preset number. In addition, after the location information identification operation is stopped, the processor 130 may acquire a second conversion function (image correction information) necessary for the keystone correction operation based on the first location information and the second location information.

Here, the preset number of the first object may be the same as the preset number of the second object. For example, referring to FIG. 10, the preset number of the first object may be four and the preset number of the second object may be four.

If four pieces of first location information of the first object are not identified, the processor 130 may provide guide information for additionally identifying the first location information to a user. The reason that all pieces of the first location information are not identified may mean that the arrangement of the projector 100 or the target area is not suitable.

When four pieces of first location information of the first object are identified, the processor 130 may identify the second location information of the second object. The processor 130 may identify whether the second object is included in the captured image, and when the identified second object is located at a specific location for a critical time, the processor 130 may identify the specific location as the second location information. A user may make the camera 120 may recognize the second object by referring to the projected first object. Accordingly, the processor 130 may determine whether the second location information is identified as many as the number of pieces of first location information. When four pieces (the number of pieces of first location information) of second location information are identified, the processor 130 may terminate the operation of identifying the second location information and acquire the second conversion function (image correction information) necessary for the keystone correction operation based on the first location information and the second location information. When the second location information of the second object is not identified by a preset number for a preset time, the processor 130 may provide guide information for additionally identifying the second location information to a user. A detailed description related thereto will be made later with reference to FIG. 21.

Meanwhile, when the preset number of second location information is not identified for the critical time in the captured image, the processor 130 may control the image projection unit 110 to project information guiding the preset number of second objects to be included in the captured image. Among the above-described operations of providing the guide information, the operation of providing the guide information according to the embodiment may be projecting the guide image through the image projection unit 110. The guide image may be projected to induce a user to capture the second object through the camera 120.

Meanwhile, although the number of objects is limited to four in the above example, this is only an example, and various numbers may be set according to implementation examples.

Meanwhile, the image projection unit 110 may include: a light source lamp configured to output a signal corresponding to the guide image including the plurality of first objects; and a lens configured to project the guide image based on the signal output from the light source lamp.

Meanwhile, although it has been described that the projector 100 directly includes the camera 120 in the above-described embodiment, the projector 100 may not directly include the camera 120 according to the implementation example, and may acquire the captured image using a separate camera.

Meanwhile, the above-described embodiment described that the projector 100 directly acquires the conversion function H2 and converts the image, but according to the implementation example, the external device may acquire the conversion function H2 based on the first location information and the second location information, and convert the image. Accordingly, the external device may identify the first location information and the second location information by analyzing the acquired captured image through the camera, and the external device may acquire the conversion function H2 based on the first location information and the second location information. Also, the external device may acquire the output image by applying the acquired conversion function H2 to the input image. In addition, the external device may transmit the output image to the projector 100. A description of other specific operations overlapping with the above description will be omitted.

Meanwhile, the projector 100 according to the embodiment of the disclosure may acquire the conversion function H2 based on the first object and the second object in order to correct the distorted image. Since the distortion may be corrected based on a new second object (reference object) rather than the already distorted first object itself, the accuracy of the keystone correction may be improved. Meanwhile, the user's convenience may be increased because the projector 100 converts and projects the image by itself, without directly adjusting the hardware of the complicated projector 100.

Meanwhile, the keystone correction operation according to the embodiment of the disclosure may solve fine distortion that may not be solved by manual keystone correction, and may shorten the processing time while having high accuracy compared to the manual keystone operation.

Meanwhile, only simple components constituting the image forming apparatus have been illustrated and described hereinabove, but various components may be further included in the projector 100 in at the time of implementing the projector 100. Those will be described below with reference to FIG. 2.

Figure 2:
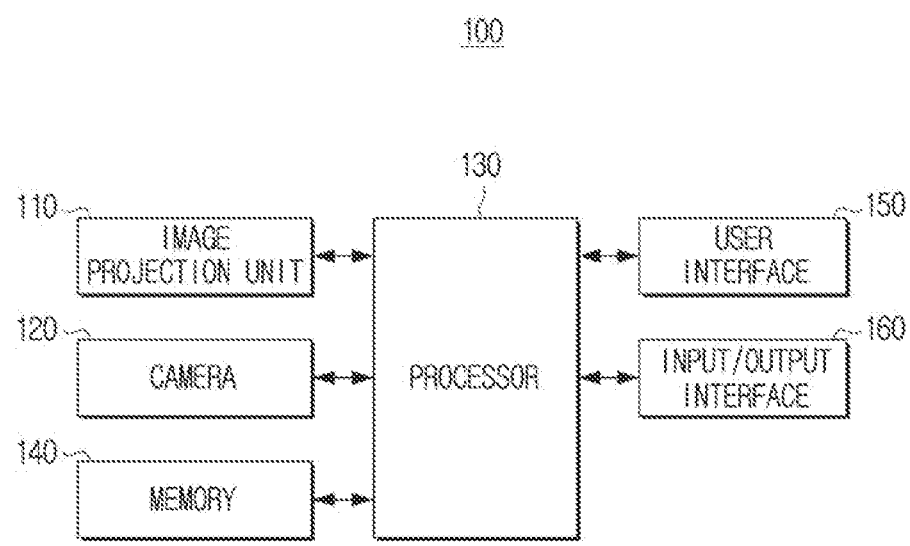
FIG. 2 is a block diagram illustrating a specific configuration of the projector of FIG. 1 according to an embodiment of the disclosure.

FIG. 2 is a block diagram illustrating a specific configuration of the projector of FIG. 1.

Referring to FIG. 2, the projector 100 may include an image projection unit 110, a camera 120, a processor 130, a memory 140, a user interface 150, and an input/output interface 160.

Meanwhile, redundant descriptions of the same operations as those described above among the operations of the image projection unit 110, the camera 120, and the processor 130 will be omitted.

The memory 140 may be implemented by an internal memory such as a read-only memory (ROM) (for example, an electrically erasable programmable read-only memory (EEPROM)), a random access memory (RAM), or the like, included in the processor 130 or be implemented by a memory separate from the processor 130. In this case, the memory 140 may be implemented in a form of a memory embedded in the projector 100 or a form of a memory attachable to and detachable from the projector 100, depending on a data storing purpose. For example, data for driving the projector 100 may be stored in the memory embedded in the projector 100, and data for an extension function of the projector 100 may be stored in the memory attachable to and detachable from the projector 100.

Meanwhile, the memory embedded in the projector 100 may be implemented by at least one of a volatile memory (for example, a dynamic RAM (DRAM), a static RAM (SRAM), a synchronous dynamic RAM (SDRAM), or the like) or a non-volatile memory (for example, a one time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash, a NOR flash, or the like), a hard drive, or a solid state drive (SSD)), and the memory attachable to and detachable from the projector 100 may be implemented in a form such as a memory card (for example, a compact flash (CF), a secure digital (SD), a micro-SD, a mini-SD, an extreme digital (xD), a multi-media card (MMC), or the like), an external memory (for example, a universal serial bus (USB) memory) connectable to a USB port, or the like.

The user interface 150 may be implemented as a device such as a button, a touch pad, a mouse, and a keyboard, or may be implemented as a touch screen capable of performing the above-described display function and manipulation input function together. Here, the button may be various types of buttons such as a mechanical button, a touch pad, a wheel, and the like, formed in any region such as a front surface portion, a side surface portion, a rear surface portion, and the like, of a body appearance of the projector 100.

The input/output interface 160 may be an interface of any one of a high definition multimedia interface (HDMI), a mobile high-definition link (MHL), a universal serial bus (USB), a display port (DP), Thunderbolt, a video graphics array (VGA) port, an RGB port, a D-subminiature (D-SUB), and a digital visual interface (DVI).

The input/output interface 160 may input/output at least one of audio and video signals.

Depending on the implementation example, the input/output interface 160 may include a port for inputting/outputting only an audio signal and a port for inputting/outputting only a video signal as separate ports, or may be implemented as a single port for inputting/outputting both an audio signal and a video signal.

The projector 100 may include a speaker (not illustrated). The speaker (not illustrated) may be a component that outputs various types of audio data processed in the input/output interface as well as various notification sounds or voice messages, etc.

Figure 3:
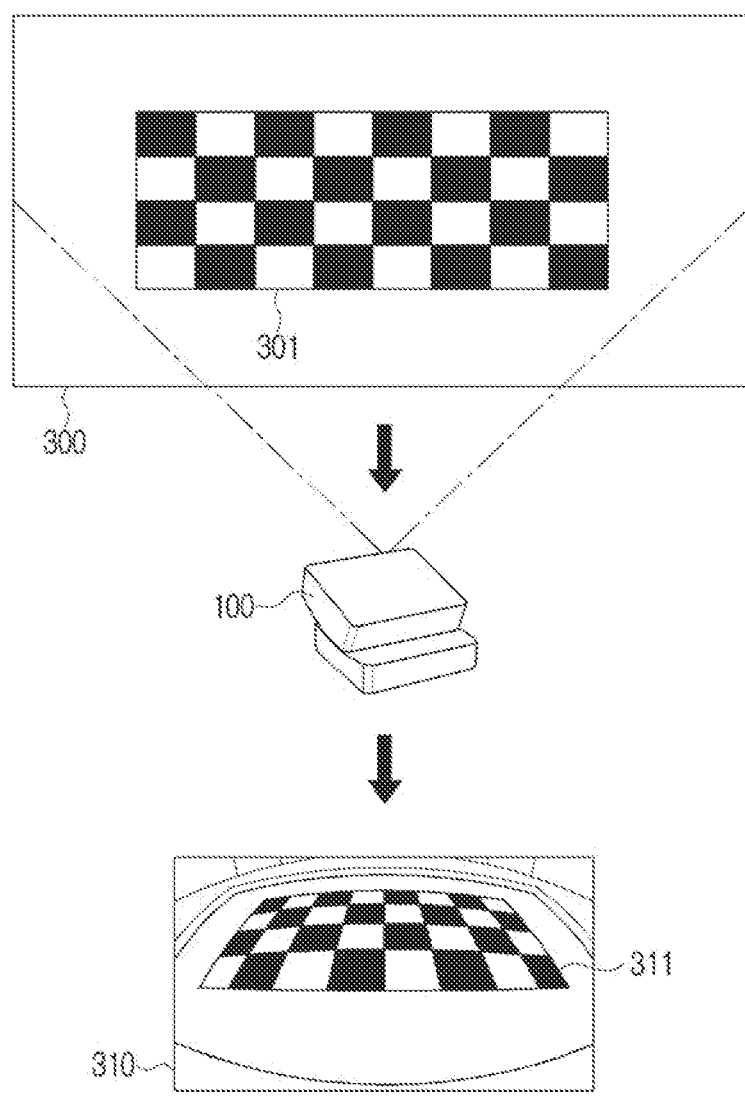
FIG. 3 is a diagram for describing an operation in which the projector captures a projected guide image according to an embodiment of the disclosure.

FIG. 3 is a diagram for describing an operation in which the projector captures a projected guide image.

Referring to FIG. 3, the projector 100 may store a guide image. The projector 100 may project the stored guide image. The projected guide image 300 may be projected onto a target area to be projected by the projector 100. Here, the target area may refer to an area on which an image corresponding to the projected guide image 300 is formed. Accordingly, the target area may mean a screen or a wall. The target area may be a white background area. However, according to an implementation example, the target area may be a black background area. Here, the projected guide image 300 may include the guide object 301.

The projector 100 may capture the guide image projected onto the target area through the camera 120. Here, the captured image will be described as the captured image 310. The captured image 310 may include a guide object 311. Here, the guide object 301 may be an object projected in real space, and the guide object 311 may be an object included in image data.

Figure 4:
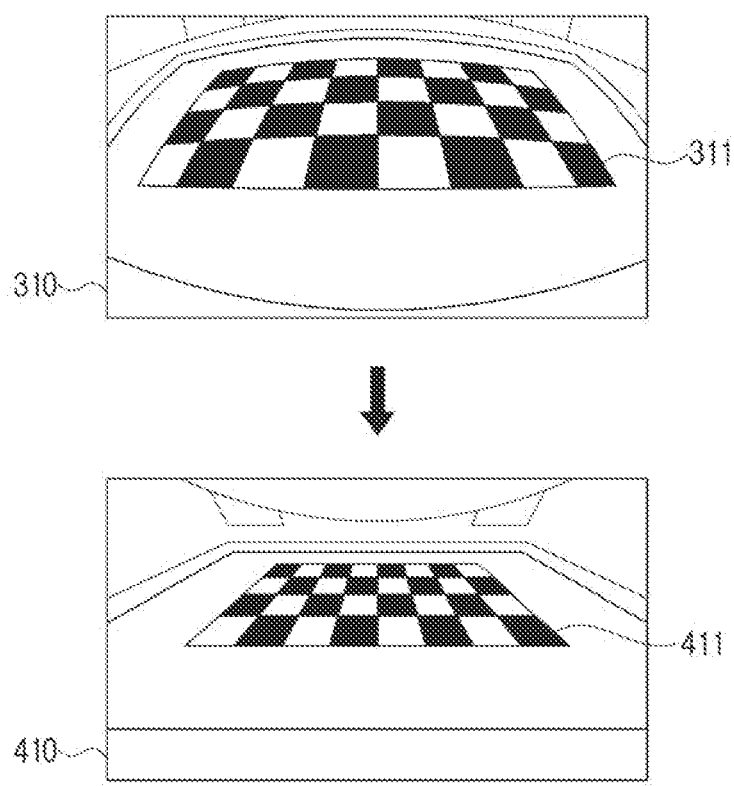
FIG. 4 is a diagram for describing a distortion correction operation for the captured image according to an embodiment of the disclosure.

FIG. 4 is a diagram for describing a distortion correction operation for the captured image.

Referring to FIG. 4, since the captured image 310 of FIG. 3 is an image captured by the camera 120, distortion may occur. Although the guide object 301 of the projected guide image 300 has a rectangular shape, the guide object 311 of the captured image 310 may have a curved shape. This may be due to the lens and imaging angle of the camera 120. When the camera 120 uses the wide-angle lens, the distortion of the captured image 310 may occur.

Accordingly, the projector 100 may perform the correction operation to reduce the distortion that occurs in the captured image 310. The correction operation may be described as the lens distortion correction operation. Also, when the camera 120 includes the wide-angle lens, the correction operation may be described as the wide-angle lens distortion correction operation.

The projector 100 may acquire a corrected image 410 (or a corrected image) by performing the lens distortion correction operation on the captured image 310. In addition, the corrected image 410 may include a guide object 411. The guide object 411 may be in a state in which the distortion is corrected compared to the guide object 311.

Figure 5:
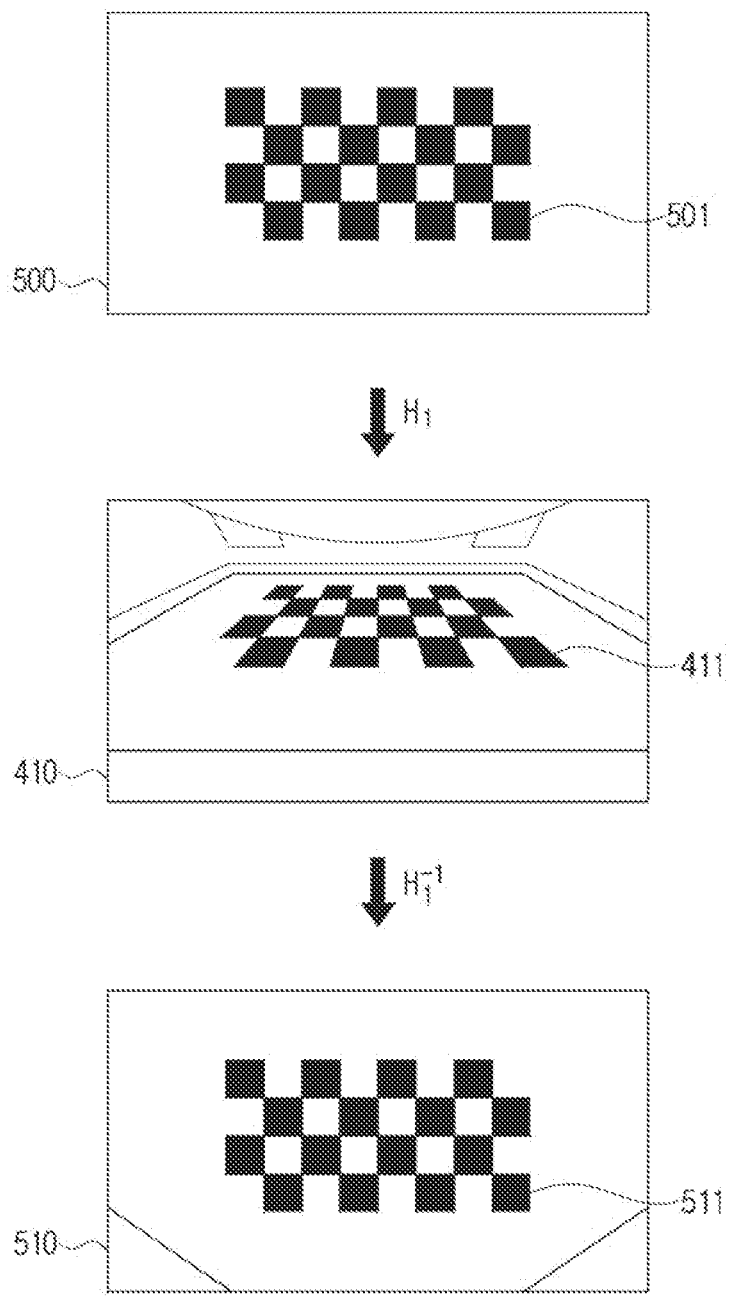
FIG. 5 is a diagram for describing an operation of acquiring a conversion function related to plane movement according to an embodiment of the disclosure.

FIG. 5 is a diagram for describing an operation of acquiring a conversion function related to plane movement.

Referring to FIG. 5, coordinates acquired by the projector 100 according to the embodiment of the disclosure may correspond to one of a camera plane and a projector plane. Thus, the image coordinates may be different depending on the camera plane or the projector plane. However, since the coordinates of each pixel constituting the image are the same, a certain relational expression may exist between the camera plane and the projector plane. The projector 100 may acquire the conversion function H1 corresponding to the relationship between the camera plane and the projector plane.

The input guide image 500 corresponding to the projector plane may include a guide object 501. The input image 500 may refer to an image input to the projector 100. Accordingly, the projector 100 may project the input guide image 500 onto the target area, and the projected image (or projection image) may be the projected guide image 300 of FIG. 3. That is, the projector 100 may project the input guide image 500 to display the projected guide image 300 on the target area. In addition, the projector 100 may acquire the captured image 310 by capturing the projected guide image 300, and the projector 100 may perform the lens distortion correction operation on the captured image 310 to acquire the corrected image 410. Here, the corrected image 410 may be an image corresponding to the camera plane.

The projector 100 may acquire the conversion function H1 based on the input image 500 corresponding to the projector plane and the corrected image 410 corresponding to the camera plane. Here, the conversion function H1 may be a function related to the plane movement. The coordinates of the projector plane may be changed to the coordinates of the camera plane based on the conversion function H1. Specifically, the projector 100 may acquire the conversion function H1 for converting the input image 500 into the corrected image 410. The input image 500 may be a projector plane image, and the corrected image 410 may be a camera plane image. Here, the projector plane image may refer to an image corresponding to a plane of image data input to the projector 100. In addition, the camera plane image may refer to an image corresponding to a plane of image data captured by the camera 120.

Here, the conversion function may be a function related to homography. Here, the homography may refer to a conversion relationship between one plane and another plane. Accordingly, the projector 100 may acquire the conversion function H1 capable of converting the input image 500 into the corrected image 410 based on the plane relationship between the input image 500 and the corrected image 410. In addition, the projector 100 may acquire an inverse function $H1^{-1}$ of the conversion function H1. Here, the input image 500 may be a projector plane and the corrected image 410 may be a camera plane. Accordingly, the conversion function H1 may be a function corresponding to the conversion relationship from the projector plane into the camera plane. In addition, the inverse function HO of the conversion function H1 may be a function corresponding to the conversion relationship from the camera plane into the projector plane.

The projector 100 may convert the corrected image 410 of the camera plane into the projector plane image based on the acquired inverse function $H1^{-1}$ of the conversion function H1. Here, the converted image 510 (or the converted image) may include a guide object 511. Here, both the input image 500 and the converted image 510 may correspond to the projector plane image. However, the input image 500 may correspond to original image data, and the converted image 510 is image data converted by the inverse function $H1^{-1}$ of the conversion function H1 after being captured by the camera 120. Accordingly, a difference may occur between the input image 500 and the converted image 510. Specifically, since the input image 500 is projected through the image projection unit 110, a difference may occur depending on the lens included in the projector 100, the projection angle of the projector 100, and the like.

Figure 6:
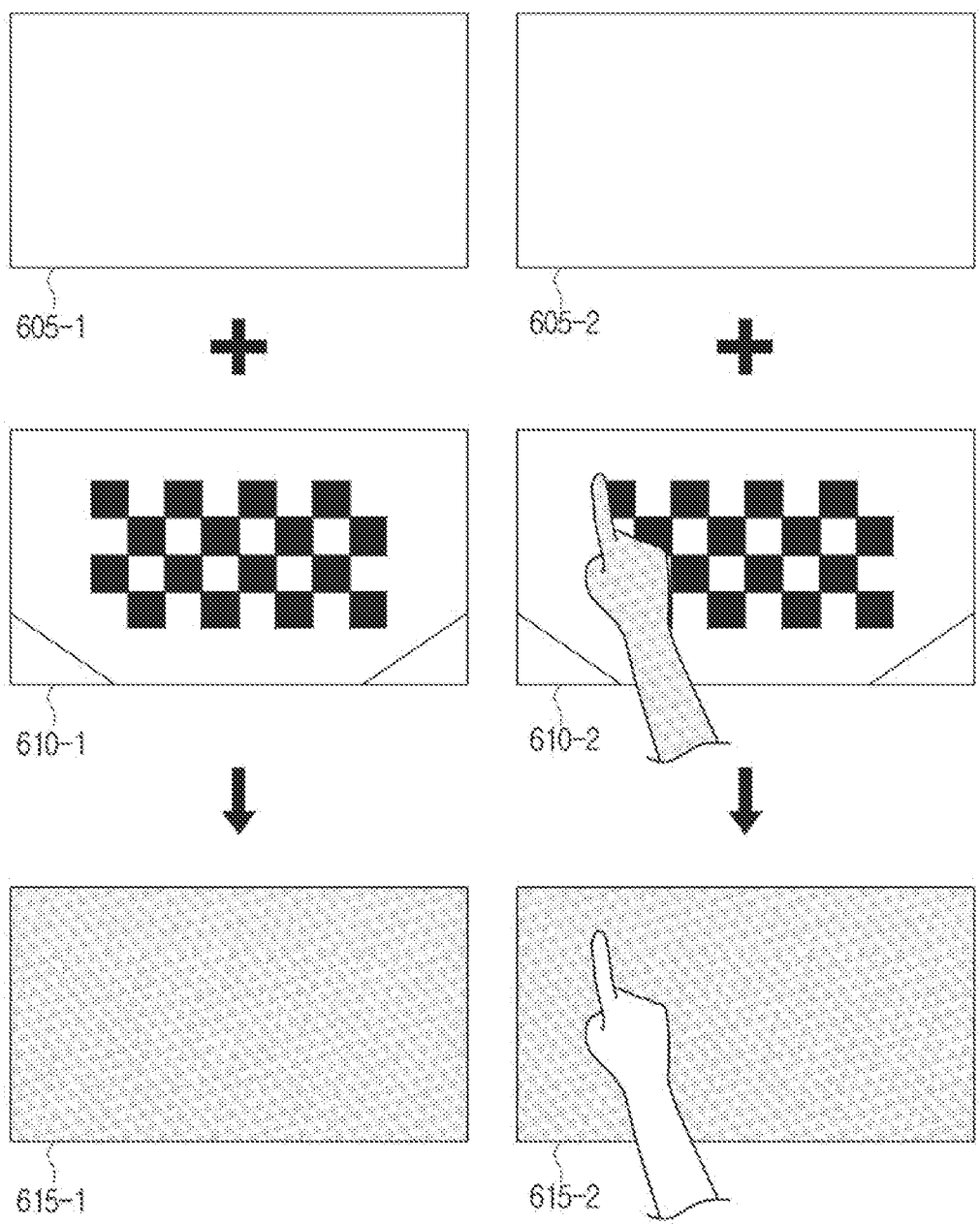
FIG. 6 is a diagram for describing an operation of identifying a second object according to an embodiment.

FIG. 6 is a diagram for describing an operation of identifying a second object according to an embodiment.

Referring to FIG. 6, the projector 100 may identify a predefined object based on the converted image. Here, the predefined object may be a human body part. For example, the predefined object may be a human fist. According to an implementation example, the predefined object may be a polygonal object. For convenience of description, the above-described predefined object is described as a second object. The projector 100 may acquire a reference image 615-1 based on a blank image 605-1 and a converted image 610-1 corresponding to the projector plane. Here, the blank image 605-1 may refer to an image without any image information, and the converted image 610-1 may be the converted image 510 of FIG. 5. In addition, the projector 100 may acquire a color difference value between the blank image 605-1 and the converted image 610-1. In addition, the projector 100 may generate a reference image 615-1 based on the acquired color difference value. The reference image 615-1 may be an image to which a certain color (e.g., gray) is given when the difference between the blank image 605-1 and the converted image 610-1 is the same.

The projector 100 may acquire a comparison target image 615-2 based on the blank image 605-2 and the converted image 610-2 corresponding to the projector plane. Here, the blank image 605-2 may be the same as the blank image 605-1. In addition, the second object may be additionally identified in the converted image 610-2 differently from the converted image 610-1. Here, the projector 100 may acquire the comparison target image 615-2 based on the color difference values set in the blank image 605-2, the converted image 610-2, and the reference image 615-1. Unlike the reference image 615-1, in the comparison target image 615-2, the second object may be additionally identified. Since the color difference value of the blank image 605-2 and the converted image 610-2 is different from the color difference value between the blank image 605-1 and the converted image 610-1, the projector 100 may identify the second object based on the color difference value.

Figure 7:
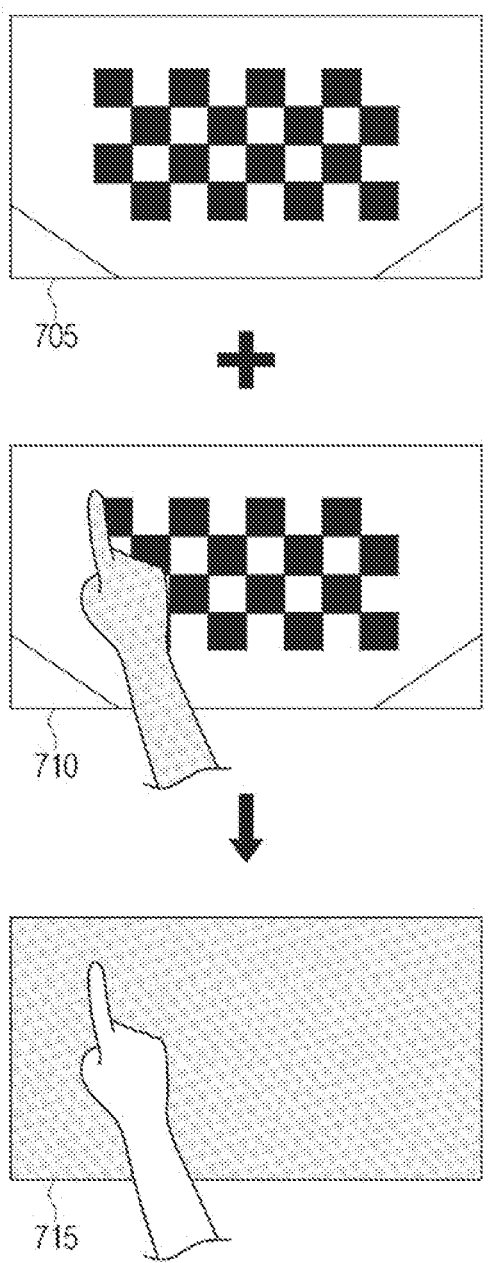
FIG. 7 is a diagram for describing an operation of identifying a second object according to another embodiment.

FIG. 7 is a diagram for describing an operation of identifying a second object according to another embodiment.

Referring to FIG. 7, the projector 100 may acquire a comparison target image 715 based on a converted image 705 corresponding to the projector plane and a converted image 710 corresponding to the projector plane. Here, the converted image 705 may be the converted image 610-1 of FIG. 6, and the converted image 710 may be the converted image 610-2 of FIG. 6. Unlike the embodiment of FIG. 6, the projector 100 according to the embodiment of FIG. 7 may identify an additionally identified object based on the converted image 705. In the converted image 710, the second object may be additionally identified differently from the converted image 705. The projector 100 may acquire a comparison target image 715 based on the color difference between the converted image 705 and the converted image 710. In addition, the projector 100 may identify whether the second object is included in the comparison target image 715.

Figure 8:
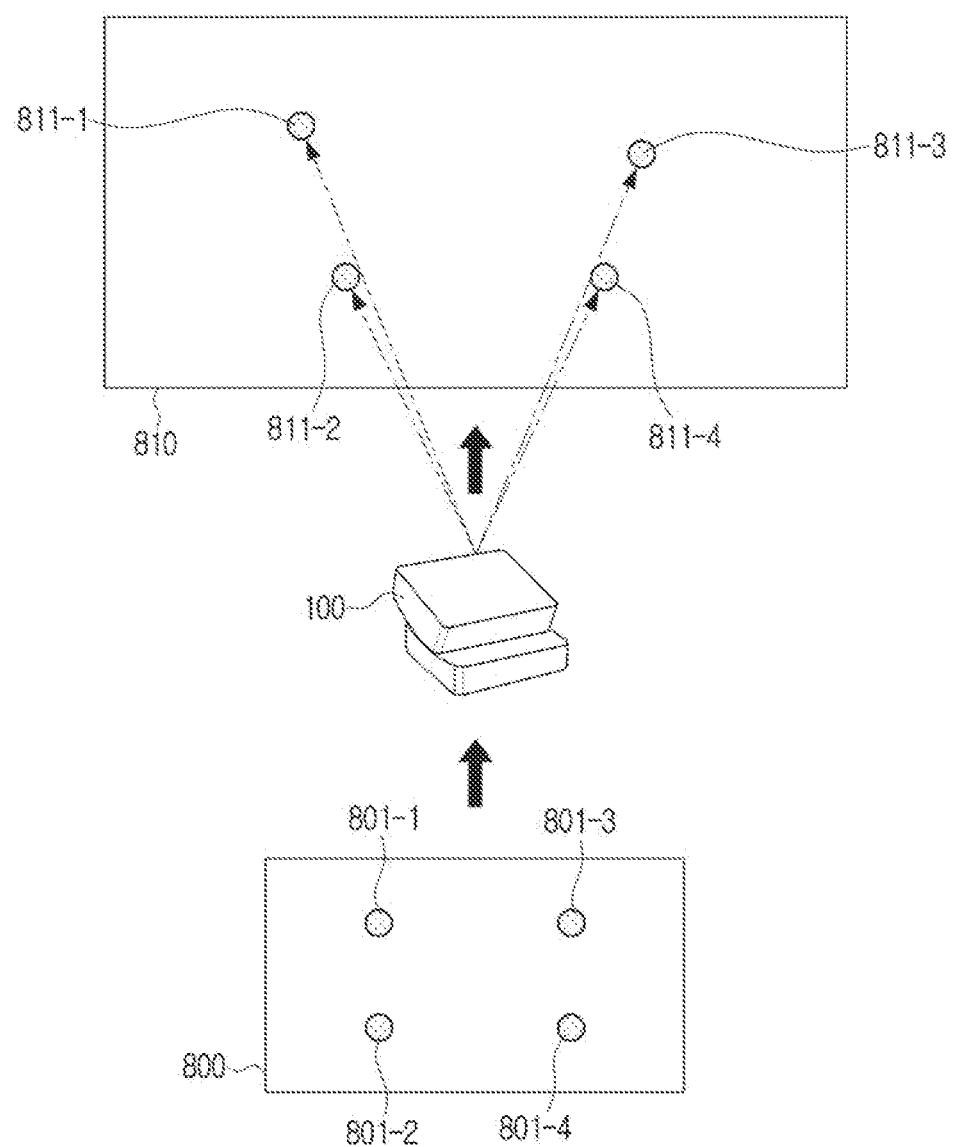
FIG. 8 is a diagram for describing an operation of projecting a guide image according to an embodiment of the disclosure.

FIG. 8 is a diagram for describing an operation of projecting a guide image.

Referring to FIG. 8, the projector 100 may project the input guide image 800 through the image projection unit 110. The input guide image 800 may include a plurality of point objects 801-1, 801-2, 801-3, and 801-4. Although the input guide image 500 of FIG. 5 includes a rectangular object, according to an implementation example, a plurality of point objects 801-1 to 801-4 related to a rectangular shape may be included in the input guide image 800 as illustrated in FIG. 8. The projector 100 may project the input guide image 800 onto the target area through the image projection unit 110.

Here, the projected image 810 may include a plurality of point objects 811-1, 811-2, 811-3, and 811-4. However, the point objects 811-1 to 811-4 of the projected image 810 may be partially different from the point objects 801-1 to 801-4 of the input guide image 800. This is because the projected image 810 and the input guide image 800 may be different depending on the lens of the projector 100 or the projection angle of the projector 100.

Therefore, in the input guide image 800, the point objects 801-1 to 801-4 are located in a rectangular shape, but in the projected image 810, the point objects 801-1 to 801-4 may not be located in the same shape as the input guide image 800.

Meanwhile, the plurality of point objects 801-1 to 801-4 and 811-1 to 811-4 described in FIG. 8 may be described as the first object.

Figure 9:
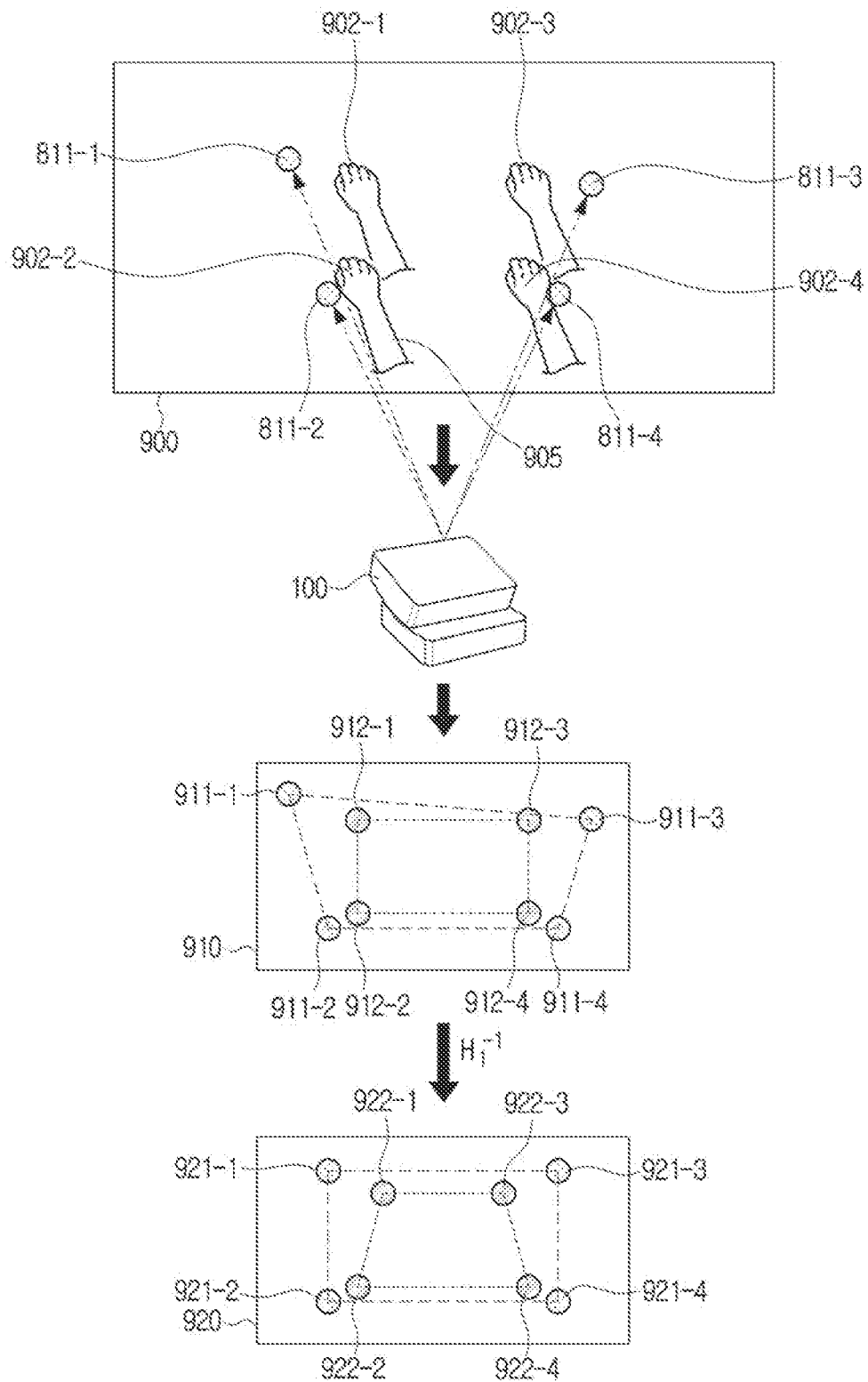
FIG. 9 is a diagram for describing an operation of identifying a second object according to an embodiment.

FIG. 9 is a diagram for describing an operation of identifying a second object according to an embodiment.

Referring to FIG. 9, the projector 100 may identify a predefined object other than the first object. Here, the predefined object may be described as the second object. The second object may refer to a guide object for keystone correction other than the first object. For example, the second object may be a fist object of a human body, and when the fist object is located at a specific location for a critical time or longer, the projector 100 may identify location information corresponding to the specific location of the fist object.

Here, the projected image 900 may be the projected image 800 of FIG. 8. The projector 100 may capture the projected image 900 through the camera 120. The captured image may be a captured image 910.

The captured image 910 may include first objects 911-1, 911-2, 911-3, and 911-4. Accordingly, the projector 100 may identify the first location information corresponding to the location of the first object in the captured image 910. In FIG. 9, since there are four first objects 911-1 to 911-4, the number of pieces of first location information may also be four.

The captured image 910 may include second objects 912-1, 912-2, 912-3, and 912-4. In addition to the projected image 900, the projector 100 may capture the second objects 902-1 to 902-4 corresponding to a part of a body of a user 905 together. Accordingly, the captured image 910 may include not only the first objects 911-1 to 911-4 but also the second objects 902-1 to 902-4. Meanwhile, for convenience of description, the second object is illustrated as a predefined point object rather than a part of a body. For example, the captured image 910 may be an image in which the fist object is replaced by the point object 912-1 to 912-4, rather than the captured original image. The projector 100 may identify the second location information corresponding to the locations of the second objects 912-1 to 912-4 in the captured image 910. In FIG. 9, since there are four second objects 912-1 to 912-4, the number of pieces of second location information may also be four.

Here, the captured image 910 may be the image of the camera plane. The projector 100 may convert an image of a camera plane into a projector plane image. Specifically, the projector 100 may acquire a converted image 920 by applying the inverse function $H1^{-1}$ of the conversion function H1 to the captured image 910. Here, the converted image 920 may be an image corresponding to the projector plane.

The converted image 920 may include first objects 921-1 to 921-4 and second objects 922-1 to 922-4. Since the converted image 920 is converted from the camera plane into the projector plane, unlike the first objects 911-1 to 911-4 of the captured image 910 arranged in a distorted form, the first object 921 of the converted image 920 may have a rectangular shape. Meanwhile, the second objects 912-1 to 912-4 of the captured image 910 having the rectangular shape may be converted into the distorted form like the second objects 922-1 to 922-4 of the converted image 920.

Figure 10:
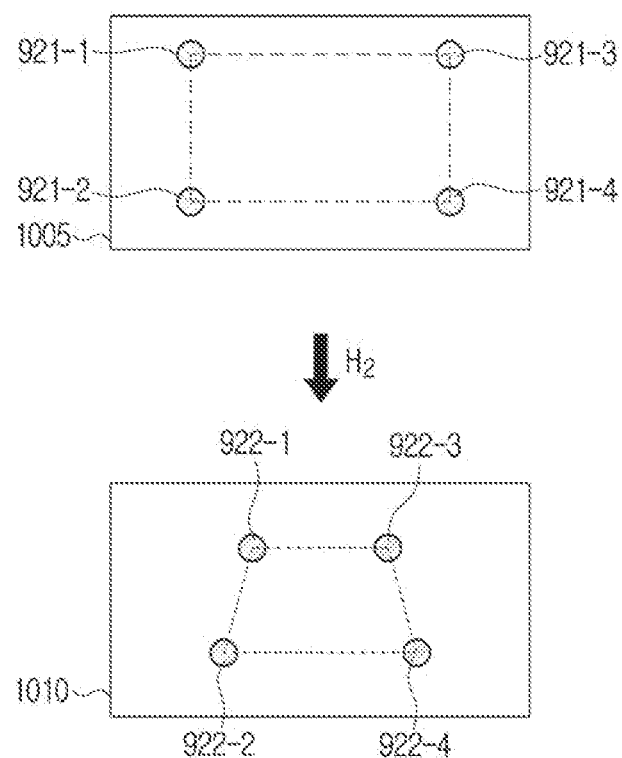
FIG. 10 is a diagram for describing an operation of acquiring a conversion function between first location information and second location information according to an embodiment of the disclosure.

FIG. 10 is a diagram for describing an operation of acquiring a conversion function between first location information and second location information.

Referring to FIG. 10, the projector 100 may analyze the relationship between the first location information of the first object and the second location information of the second object in the projector plane.

The first objects 921-1 to 921-4 and the second objects 922-1 to 922-4 may be separated from the converted image 920. The projector 100 may acquire a first image 1005 including only the first objects 921-1 to 921-4 from the converted image 920. In addition, the projector 100 may acquire a second image 1010 including only the second objects 922-1 to 922-4 from the converted image 920.

Here, the projector 100 may acquire a conversion function based on the first image 1005 and the second image 1010. For example, the projector 100 may identify first location information of the first objects 921-1 to 921-4 included in the first image 1005 and second location information of the second objects 922-1 to 922-4 included in the second image 1010. In addition, the projector 100 may acquire the conversion function H2 for converting the first location information into the second location information. Here, the conversion function H2 may be the conversion function used for the keystone correction.

The second objects 922-1 to 922-4 may correspond to four locations acquired by allowing the user 905 to directly recognize his/her fist to the camera. Therefore, there is a possibility that the user 905 may not recognize the correct rectangle. Accordingly, in this case, the projector 100 may automatically change the location information of the second objects 922-1 to 922-4 to be an accurate rectangle.

Figure 11:
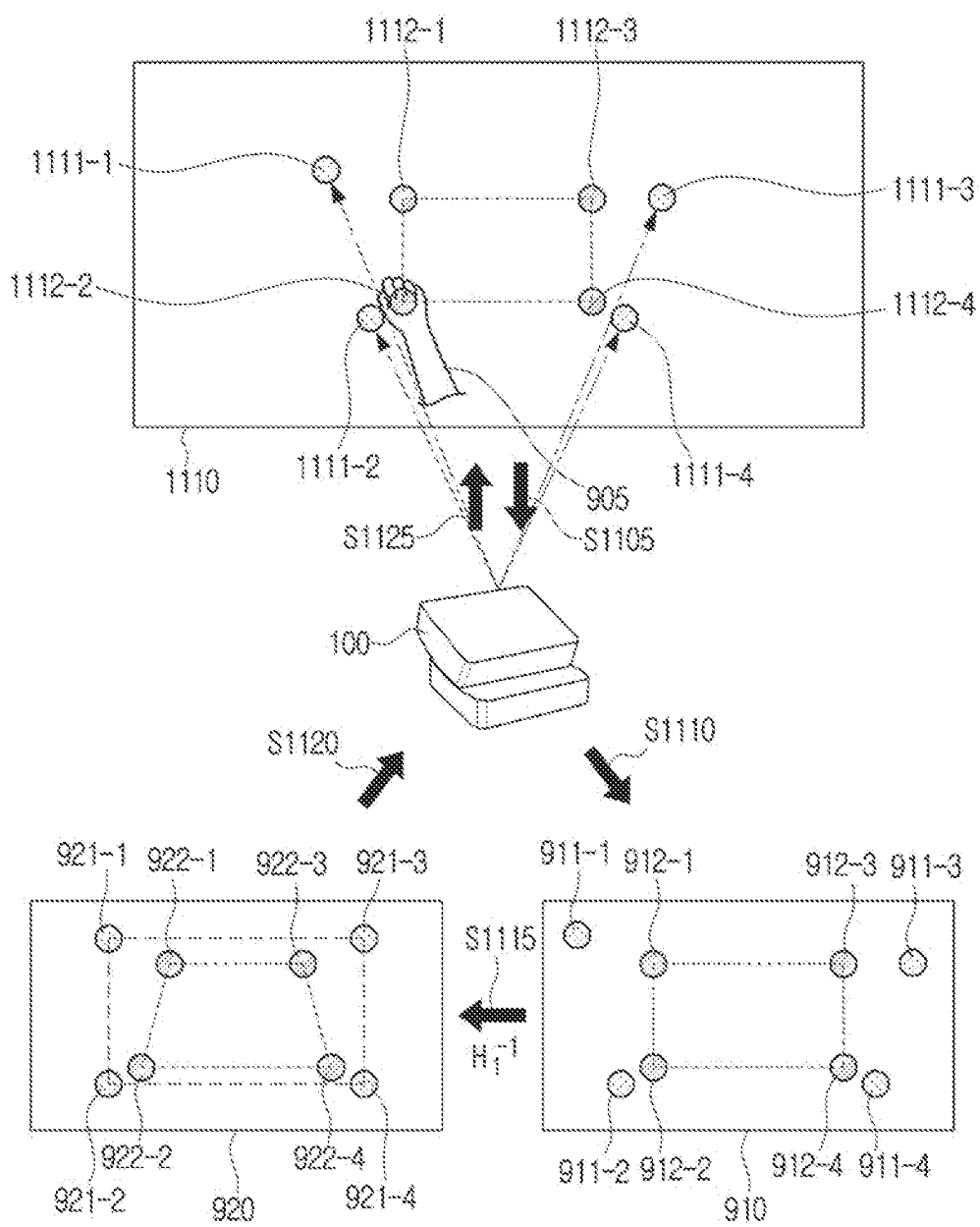
FIG. 11 is a diagram for describing an operation of identifying a location of a second object based on a captured image and projecting a guide image including the second object to the identified location according to an embodiment of the disclosure.

FIG. 11 is a diagram for describing an operation of identifying a location of a second object based on a captured image and projecting a guide image including the second object to the identified location.

Referring to FIG. 11, the projector 100 may project an image corresponding to the second object. When the fist object of the user 905 is identified in FIG. 10, the operation of the projector 100 to acquire the location information of the second objects 912-1 to 912-4 based on the location of the fist object of the user 905 has been described.

The projector 100 may project the input guide image 800 onto the target area. In addition, the projector 100 may capture the projected image 900 through the camera 120 (S1105). In addition, the projector 100 may acquire the captured image 910 corresponding to the projected image 900 (S1110). Here, the projector 100 may identify the first location information corresponding to the first object and the second location information corresponding to the second objects 902-1 to 902-4. In addition, the projector 100 may convert the captured image 910 into the converted image 920 corresponding to the projector plane by applying the inverse function $H1^{-1}$ of the conversion function H1 to the captured image 910 corresponding to the camera plane. Each of the first location information and the second location information may vary depending on whether it is a camera plane or a projector plane.

In addition, the projector 100 may generate a converted image 920 by applying the inverse function $H1^{-1}$ of the conversion function H1 to the captured image 910 (image in which the second object is partially converted into a different type of object according to the implementation example) to convert the image 920 (S1115). The converted image 920 may include first objects 921-1 to 921-4 and second objects 922-1 to 922-4. The object included in the converted image 920 may be an image whose location is changed by the inverse function $H1^{-1}$ of the conversion function H1.

The projector 100 may transmit the converted image 920 to the image projection unit 110 (S1120). In addition, the image projection unit 110 may project the converted image 920 onto the target area (S1125). A projected image 1110 may include first objects 1111-1 to 1111-4 and second objects 1112-1 to 1112-4.

As a result, the first objects 1111-1 to 1111-4 may not have a rectangular shape unlike the input guide image, but the second objects 1112-1 to 1112-4 may have a rectangular shape similar to the input guide image. Accordingly, the projector 100 may convert the input image based on the conversion relationship of the second object.

Figure 12:
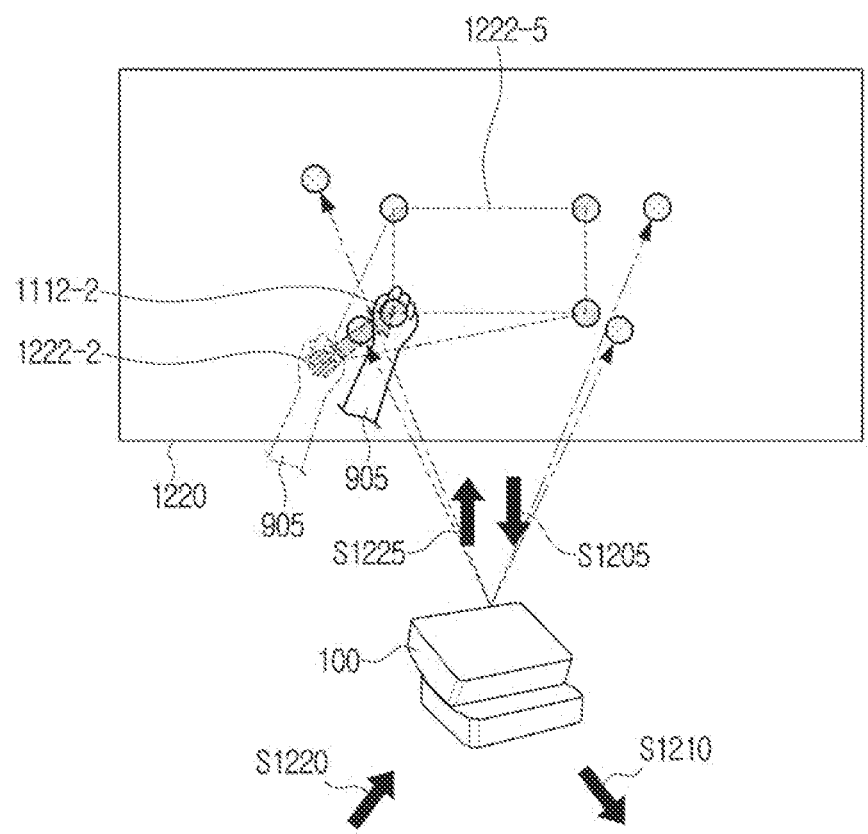
FIG. 12 is a diagram for describing an operation of changing the position of the second object included in the guide image according to an embodiment of the disclosure.
Figure 12:
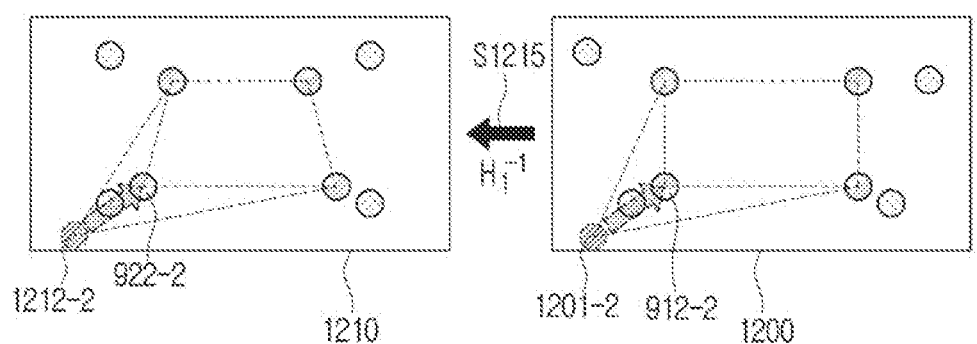

FIG. 12 is a diagram for describing an operation of changing the position of the second object included in the guide image.

Referring to FIG. 12, the user 905 may change the location of the second object. For example, the user may select one of the already projected objects and change the location of the selected object. Here, an operation of selecting one object may be to locate a predefined object for a critical time or longer in a location where one object is displayed. For example, when the predefined object is a fist object, the user 905 may put a fist on a location where one second object to be changed is projected and stop for a critical time. In addition, when one second object is selected, the user 905 may change the location of the fist. In addition, again, the user 905 puts his/her fist to the changed location and may stop for more than a critical time.

The projector 100 may capture the operation of changing the second object of the user 905 through the camera (S1205). In addition, by changing the fist object to the predefined point object, it is possible to generate a captured image 1200 (S1210). The captured image 1200 may include a second object 912-2 corresponding to the changed location instead of a second object 1201-2 corresponding to the location before the change.

In addition, the projector 100 may convert the captured image 1200 corresponding to the camera plane into a converted image 1210 corresponding to the projector plane based on the inverse function $H1^{-1}$ of the conversion function H1 (S1215). Here, the converted image 1210 may include a second object 922-2 corresponding to the changed location instead of a second object 1212-2 corresponding to the location before the change.

In addition, the projector 100 may transmit the generated converted image 1210 to the image projection unit 110 (S1220). In addition, the image projection unit 110 may project the received converted image 1210 onto the target area. In addition, the projected image 1220 may include a second object 1112-2 corresponding to the changed location instead of a second object 1222-2 corresponding to the location before the change.

Figure 13:
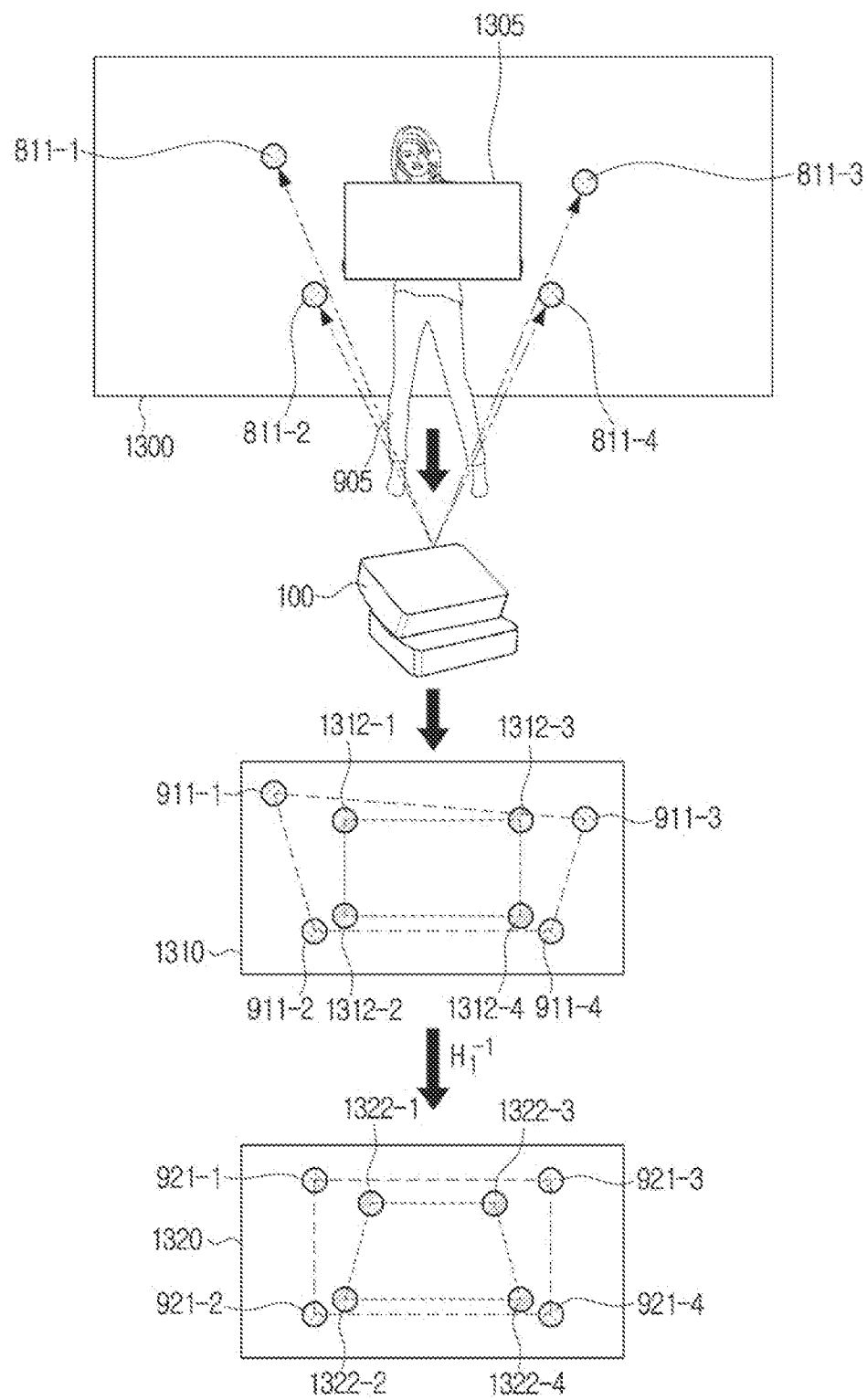
FIG. 13 is a diagram for describing an operation of identifying a location of a second object according to another embodiment.

FIG. 13 is a diagram for describing an operation of identifying a location of a second object according to another embodiment.

Referring to FIG. 13, the projector 100 may project an input guide image onto a target area. In addition, a projected image 1300 may include a plurality of first objects 811-1 to 811-4. Here, it is assumed that the user 905 is holding a guide member 1305. Here, the guide member 1305 may have a rectangular shape. In addition, the guide member 1305 may have a preset color.

The projector 100 may capture the image 1300 and the guide member 1305 projected through the camera 120. Here, the projected image 1300 may be the projected image 900 of FIG. 9. The projector 100 may identify the first location information of the first objects 811-1 to 811-4 in the captured image 1310, and the projector 100 may identify whether the predefined object is included in the captured image 1310. Here, the predefined object may be a rectangular object. According to an implementation example, the predefined object may be a rectangular object of a specific color. Accordingly, the projector 100 may identify a rectangular object in the captured image 1310. In addition, in the captured image 1310, it mat be identified that the guide member 1305 is a rectangular object. When the rectangular object is identified in the captured image 1310, the projector 100 may identify corner objects 1312-1 to 1312-4 among the identified rectangular objects, and identify location information of the identified corner objects. Here, the location information may be second location information of the second object.

Here, the captured image 1310 may be an image corresponding to the camera plane. The projector 100 may convert the captured image 1310 corresponding to the camera plane into a converted image 1320 corresponding to the projector plane. Specifically, the conversion operation may be an operation of applying the inverse function $H1^{-1}$ of the conversion function H1. Here, the converted image 1320 may include first objects 921-1 to 921-4 and second objects 1322-1 to 1322-4. In addition, the projector 100 may identify the first location information of the first objects 921-1 to 921-4 and the second location information of the second objects 1322-1 to 1322-4 based on the converted image 1320. Each of the first location information and the second location information may vary depending on whether it is a camera plane or a projector plane.

In FIG. 9, the operation of identifying the first location information and the second location information by capturing the projected image 900 and a part (fist) of a body has been described.

Meanwhile, in FIG. 13, the operation of identifying the first location information and the second location information by capturing the projected image 1300 and the guide member has been described.

Meanwhile, an embodiment in which the user takes a specific behavior has been described in FIGS. 9 and 13. According to an implementation example, the projector 100 may directly identify the second location information based on the first location information acquired in the captured image, rather than a user directly identifying a predefined object in the captured image through a specific behavior.

Figure 14:
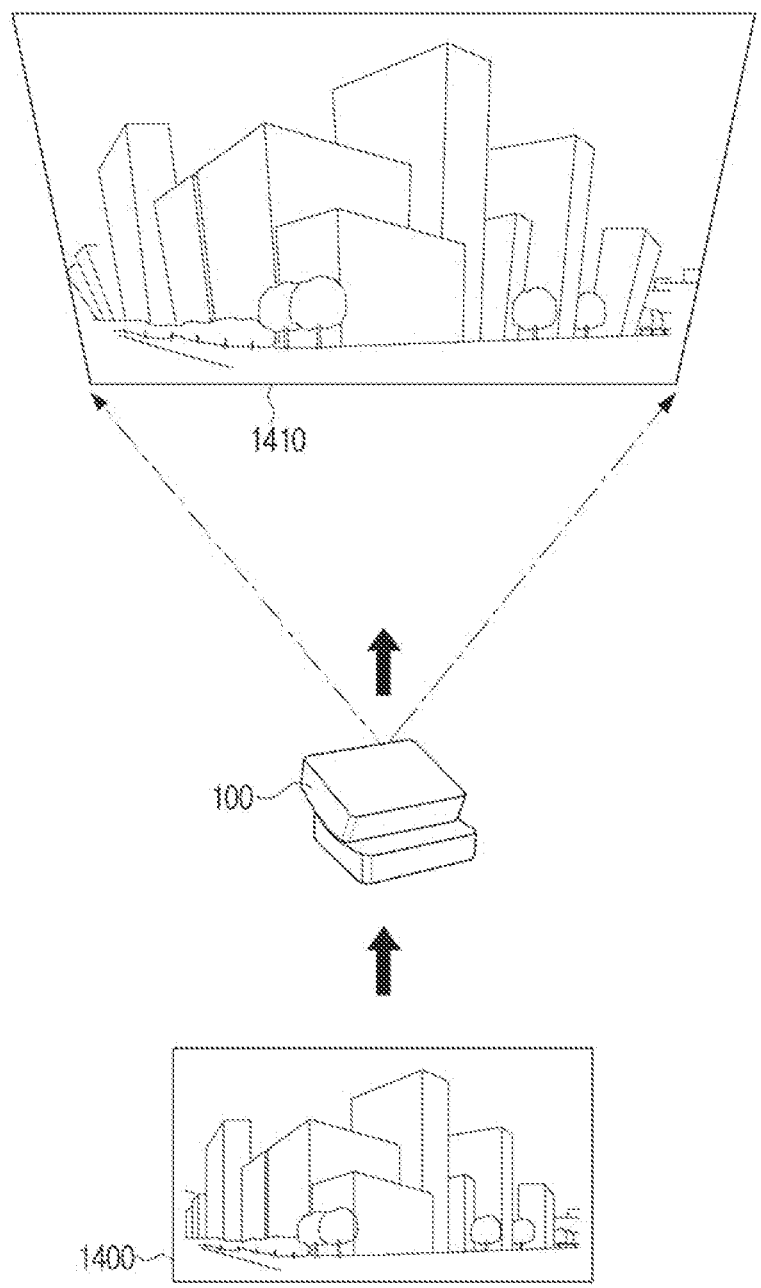
FIG. 14 is a diagram for describing a general image projection operation according to an embodiment of the disclosure.

FIG. 14 is a diagram for describing a general image projection operation.

Referring to FIG. 14, the projector 100 may project an input image 1400 onto a target area. Here, the input image 1400 may be projected onto the target area through the image projection unit 110 included in the projector 100.

A projected image 1410 may be different from the input image 1400. The input image 1400 may be displayed differently according to a focus and a magnification of a lens included in the image projection unit 110, a projection angle of the projector 100, and the like.

Accordingly, here, the projector 100 may perform the keystone correction operation so that a user can view a suitable image.

Figure 15:
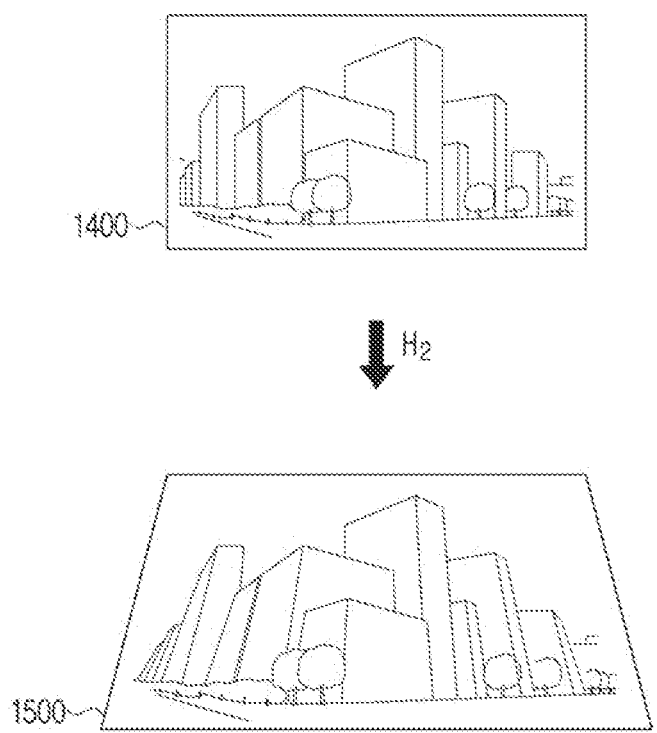
FIG. 15 is a diagram for describing an operation of performing keystone correction on an image according to an embodiment of the disclosure.

FIG. 15 is a diagram for describing an operation of performing keystone correction on an image.

Referring to FIG. 15, the projector 100 may apply the conversion function H2 to the input image 1400 before projecting the input image 1400. Here, the conversion function H2 may be acquired according to the embodiment described in FIG. 10. Specifically, the projector 100 may apply the conversion function H2 acquired based on the first location information of the first object and the second location information of the second object to the input image 1400.

Here, the projector 100 may generate a converted image 1500 by applying the conversion function H2 to the input image 1400. Here, the operation of applying the conversion function H2 to the input image 1400 may be the keystone correction operation.

Figure 16:
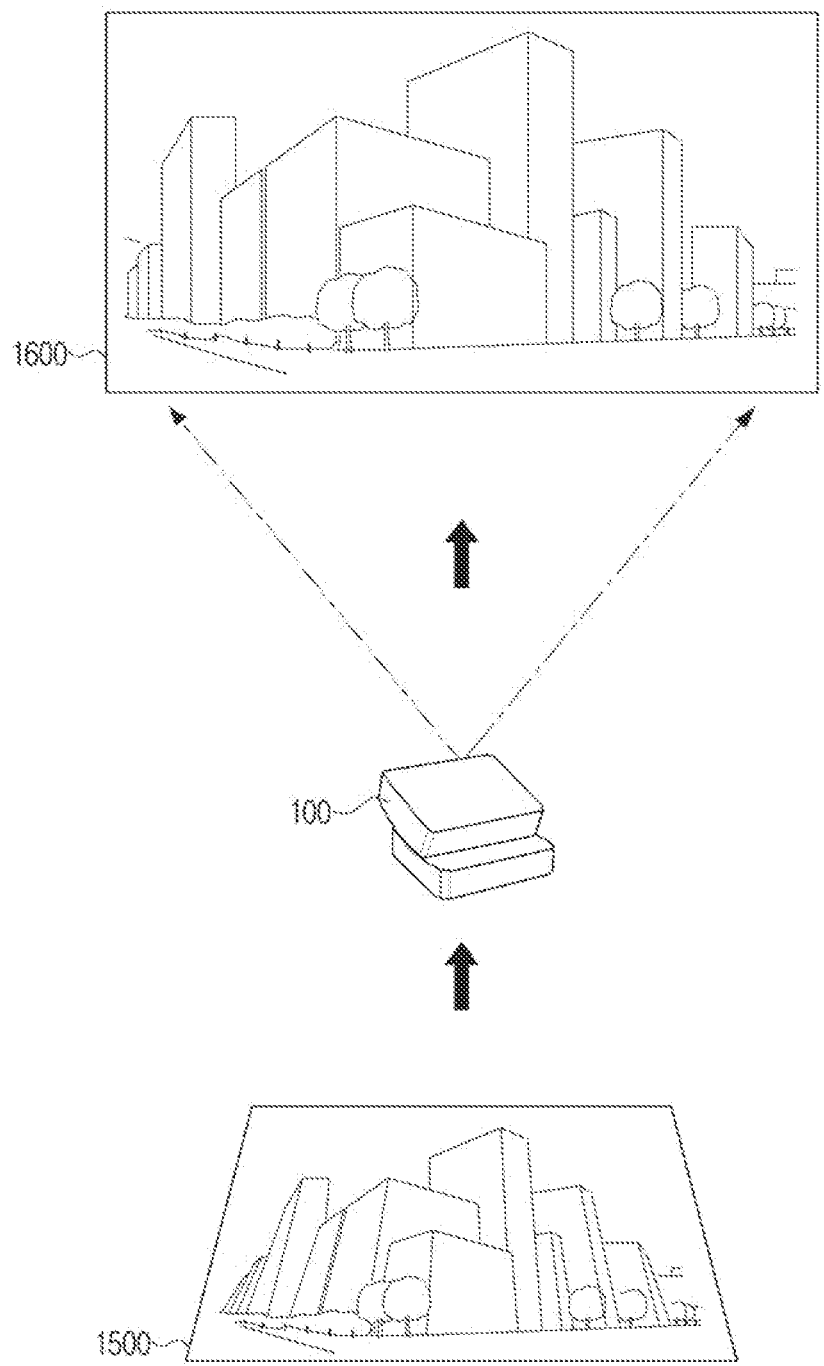
FIG. 16 is a diagram for describing an operation of projecting a keystone-corrected image according to an embodiment of the disclosure.

FIG. 16 is a diagram for describing an operation of projecting a keystone-corrected image.

Referring to FIG. 16, the projector 100 may project a converted image 1500 on which the keystone correction operation is performed onto a target area through the image projection unit 110. Since the projected image 1600 is based on the converted image 1500 on which keystone correction is performed, a user may view a suitable image.

As illustrated in FIG. 14, when an image is directly projected without the keystone correction operation, an unbalanced image may be projected. However, when the image on which the keystone correction operation is performed is projected as illustrated in FIG. 16, a balanced image may be projected.

Figure 17:
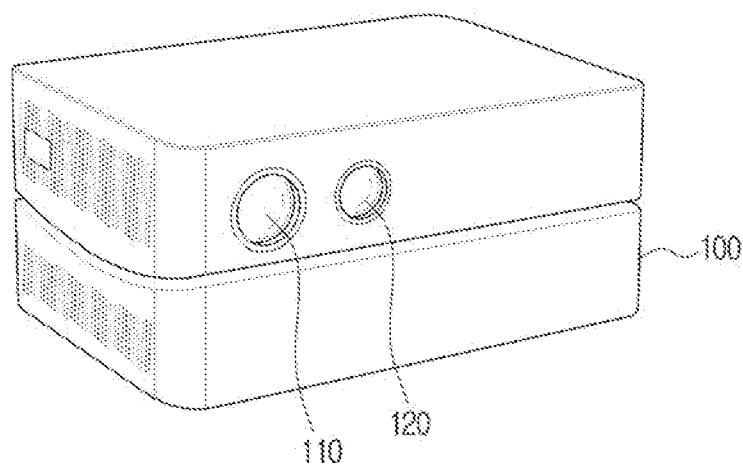
FIG. 17 is a diagram for describing a projector according to an embodiment.

FIG. 17 is a diagram for describing a projector according to an embodiment.

Referring to FIG. 17, the projector 100 may include the image projection unit 110 and the camera 120.

The projector 100 may include both the image projection unit 110 and the camera 120 in its body, and the image projection unit 110 and the camera 120 may be arranged on the same line. This is because the camera 120 captures the image projected by the image projection unit 110. Accordingly, the image projection unit 110 and the camera 120 may be arranged within a threshold distance, and the arrangement height may be the same.

Figure 18:
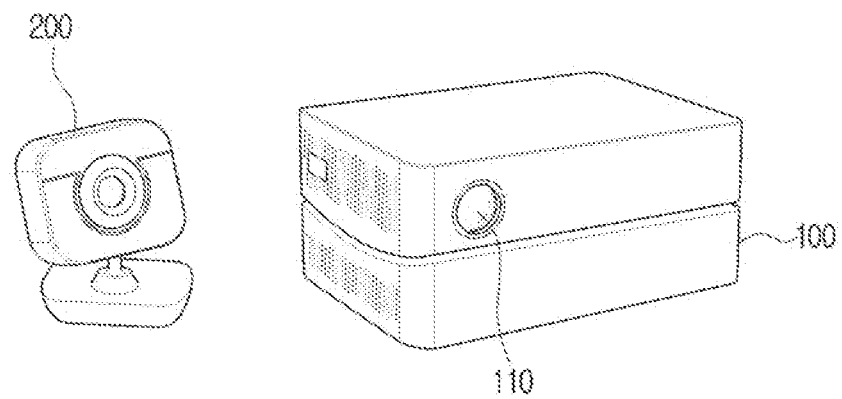
FIG. 18 is a diagram for describing a projector according to another embodiment.

FIG. 18 is a diagram for describing a projector according to another embodiment.

Referring to FIG. 18, the projector 100 may include only the image projection unit 110 without a camera. In addition, a camera 200 may exist separately. In the embodiment of FIG. 17, it has been described that the projector 100 includes a camera and an image projection unit at the same time, but in the embodiment of FIG. 18, the camera and the image projection unit may be arranged in separate devices. Accordingly, the projector 100 may perform a function of projecting an image, and the camera 200 may perform a function of capturing an image.

The keystone correction operation may be performed by the projector 100. However, the captured image may be received through the camera 200.

Meanwhile, according to an implementation example, the keystone correction operation may be performed in an external device. The external device may receive the captured image captured through the camera 200, and perform the keystone correction operation on the input image based on the received captured image. In addition, the output image on which the keystone correction operation is performed may be transmitted to the projector 100.

Figure 19:
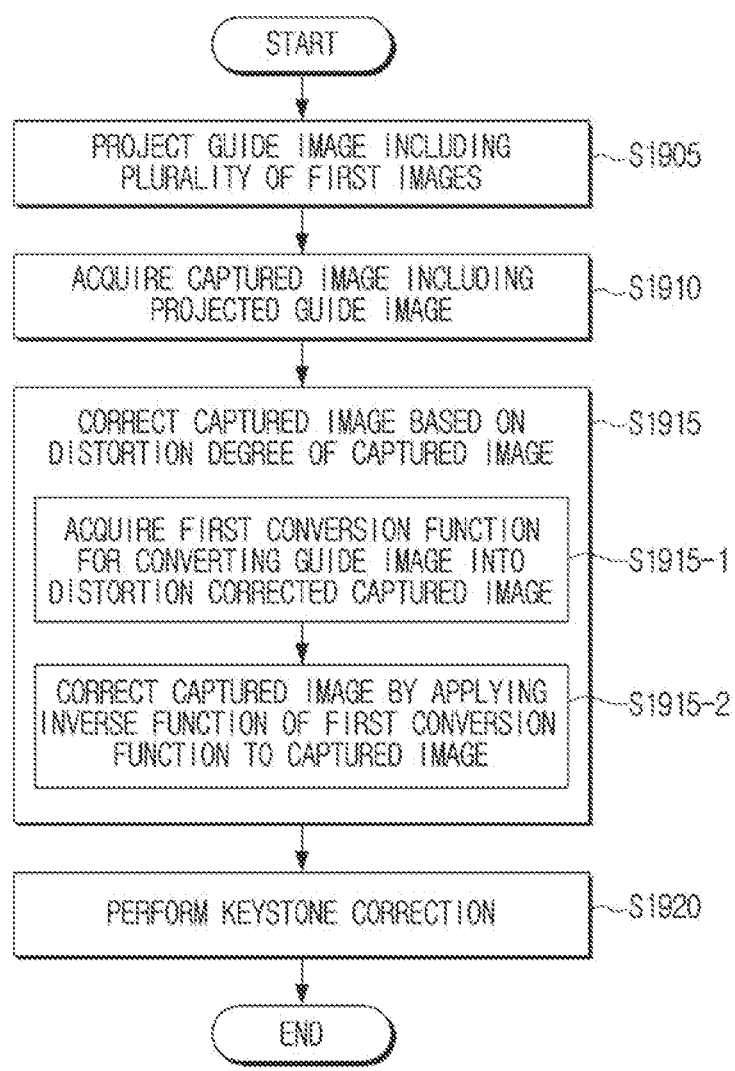
FIG. 19 is a flowchart for describing an operation of performing keystone correction based on an operation of correcting distortion of a captured image according to an embodiment of the disclosure.

FIG. 19 is a flowchart for describing an operation of performing keystone correction based on an operation of correcting distortion of a captured image.

Referring to FIG. 19, the projector 100 may project a guide image (or an input guide image) including a plurality of first objects to a target area through the image projection unit 110 (S1905).

In addition, the projector 100 may acquire a captured image (or a captured image) including a projected image (or a projected guide image) through the camera 120 (S1910).

In addition, the projector 100 may correct the captured image based on the degree of distortion of the captured image (S1915). Here, the correction operation may refer to lens distortion correction. Specifically, the projector 100 may acquire a first conversion function for converting the distortion-corrected captured image from the guide image (input guide image) (S1915-1). In addition, the projector 100 may perform correction by applying the inverse function of the first conversion function to the captured image (S1915-2). Here, the description of the first conversion function and its inverse function has been described in FIG. 5.

In addition, the projector 100 may perform the keystone correction (S1920).

Figure 20:
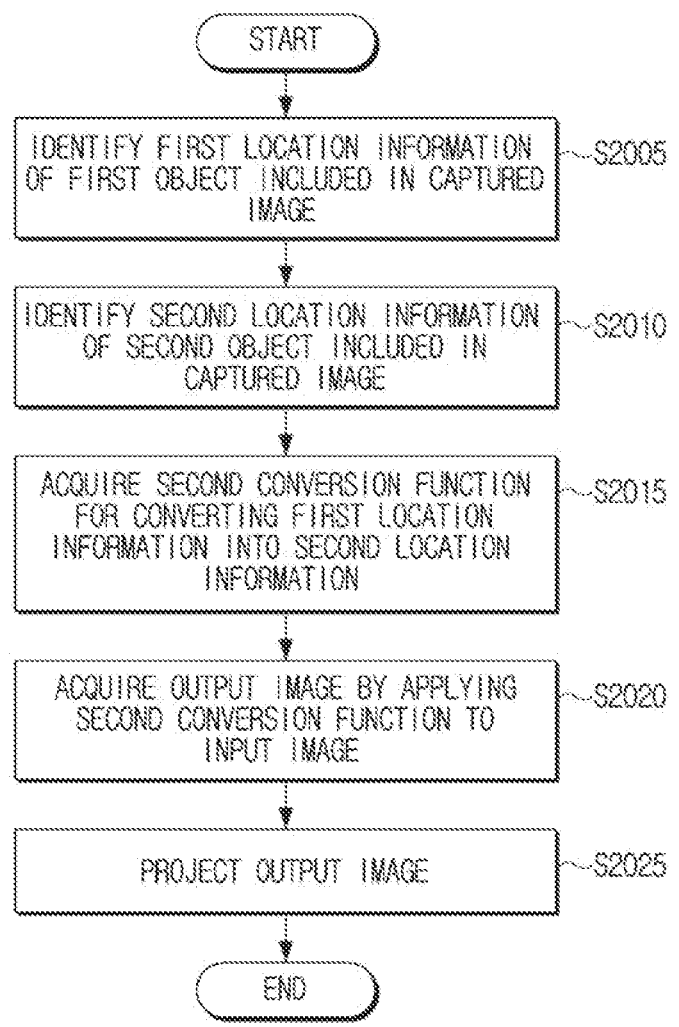
FIG. 20 is a flowchart for specifically describing keystone correction according to an embodiment of the disclosure.

FIG. 20 is a flowchart for specifically describing keystone correction.

Referring to FIG. 20, the projector 100 may identify the first location information of the first object included in the captured image corresponding to the camera plane (S2005). Here, the number of first objects may be plural.

In addition, the projector 100 may identify the second location information of the second object based on the captured image corresponding to the camera plane (S2010). Here, the number of second objects may be plural. In addition, the number of second objects may be the same as the number of first objects.

According to an embodiment, the second object may be an object corresponding to a part of a human body. According to another embodiment, the second object may be an object corresponding to the guide member. According to another embodiment, the second location information may be automatically identified based on the first location information.

In addition, the projector 100 may acquire the second conversion function for converting the first location information into the second location information (S2015). Here, the second conversion function may be a function for the keystone correction.

In addition, the projector 100 may acquire an output image by applying the second conversion function to the input image (S2020). Here, the output image may refer to an image converted by the second conversion function.

In addition, the projector 100 may project the acquired output image to the target area through the image projection unit 110 (S2025).

Meanwhile, in the above description, it has been described that the first location information and the second location information are identified on a camera plane. However, according to the implementation example, the first location information and the second location information may be identified in the projector plane. For example, the projector 100 may convert the captured image into the converted image based on the inverse function $H1^{-1}$ of the conversion function H1. Here, the converted image may be an image corresponding to the projector plane. In addition, the projector 100 may identify the location information of the first object and the second location information of the second object in the converted image. In addition, the projector 100 may compare the location information of the first object and the second location information of the second object acquired from the projector plane.

Figure 21:
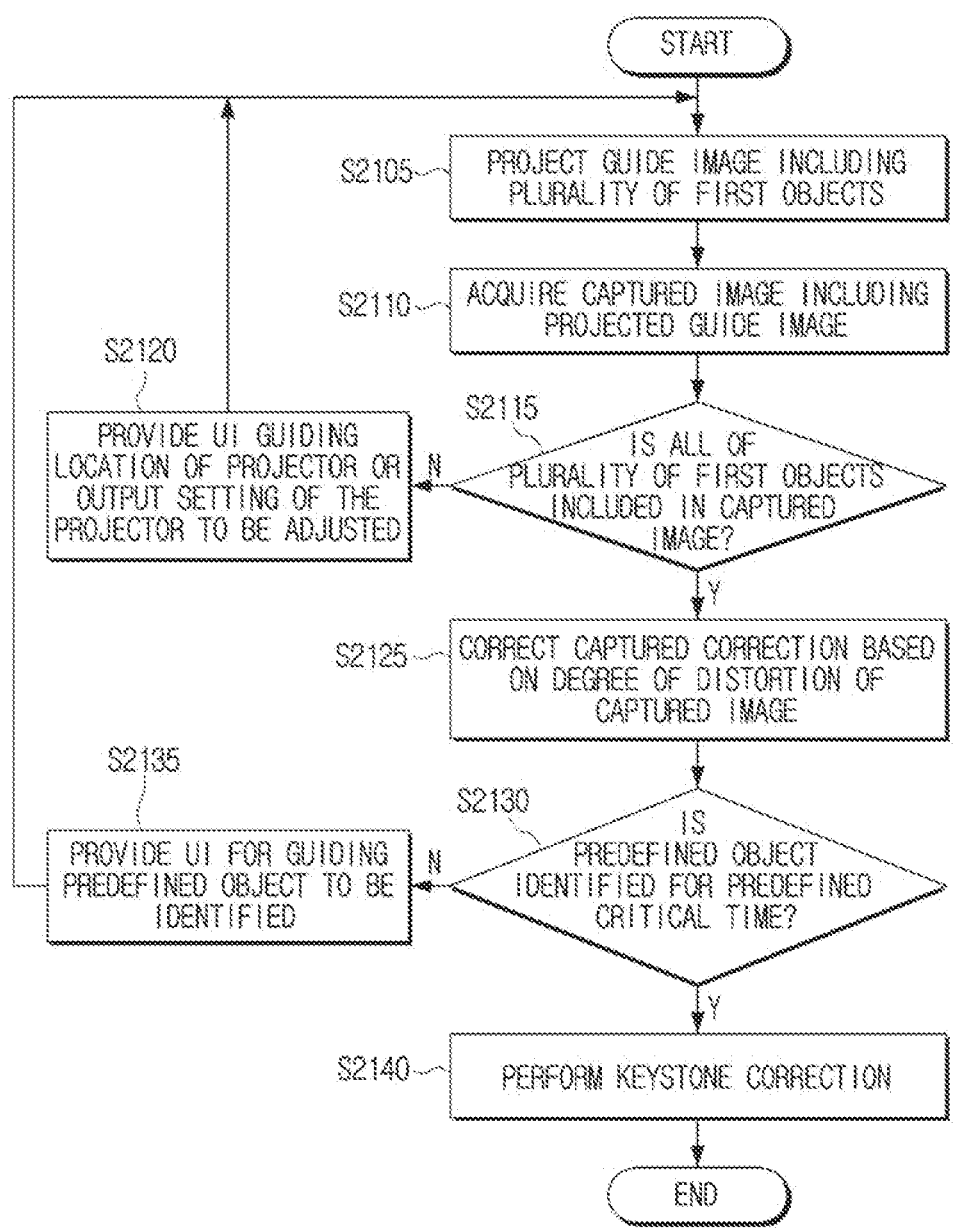
FIG. 21 is a flowchart illustrating an operation of providing guide information to a user.

FIG. 21 is a flowchart illustrating an operation of providing guide information to a user.

Referring to FIG. 21, the projector 100 may project a guide image including a plurality of first objects through the image projection unit 110 (S2105). In addition, the captured image including the projected guide image may be acquired through the camera 120 (S2110).

In addition, the projector 100 may identify whether all of the plurality of first objects are included in the captured image (S2115). The number of first objects may be plural. Here, it is assumed that the number of first objects is four. The projector 100 may determine whether all four first objects are identified in the captured image. When all four first objects are not included, the arrangement location of the projector 100 may be incorrect or the output setting may be incorrect. Therefore, the projector 100 may automatically adjust the output setting of the projector 100 to control the captured image to include the four first objects. Here, when four first objects are not identified in the captured image, the projector 100 may provide a user with a UI that guides the location of the projector 100 or the output setting of the projector 100 to be adjusted (S2120) In addition, steps S2105, S2110, and S2115 may be performed again.

Meanwhile, when four first objects are identified in the captured image, the projector 100 may correct the captured image based on the degree of distortion of the captured image (S2125). In addition, the projector 100 may determine whether a predefined object is identified during a predefined critical time (S2130). For example, the projector 100 may determine whether a fist object (predefined object) is identified in a captured image for 4 seconds (critical time).

Meanwhile, when the predefined object in the captured image is not identified for a critical time, the projector 100 may provide a user with a UI that guides the predefined object to be identified (S2135). In addition, steps S2105, S2110, and S2115 may be performed again.

In addition, when the predefined object in the captured image is identified for a critical time, the projector 100 may perform the keystone correction (S2140).

Providing the UI described in steps S2120 and S2135 may refer to projecting the image guide information to the target area. According to an implementation example, the projector 100 may additionally include a speaker, and providing the UI may be replaced by an operation of outputting audio guide information. Meanwhile, according to another embodiment, the projector 100 may further include a display, and the projector 100 may display a guide UI (image guide information) on the display.

A user may know that the projector 100 needs to be directly manipulated or needs to take a specific operation through the audio guide information or the image guide information.

Figure 22:
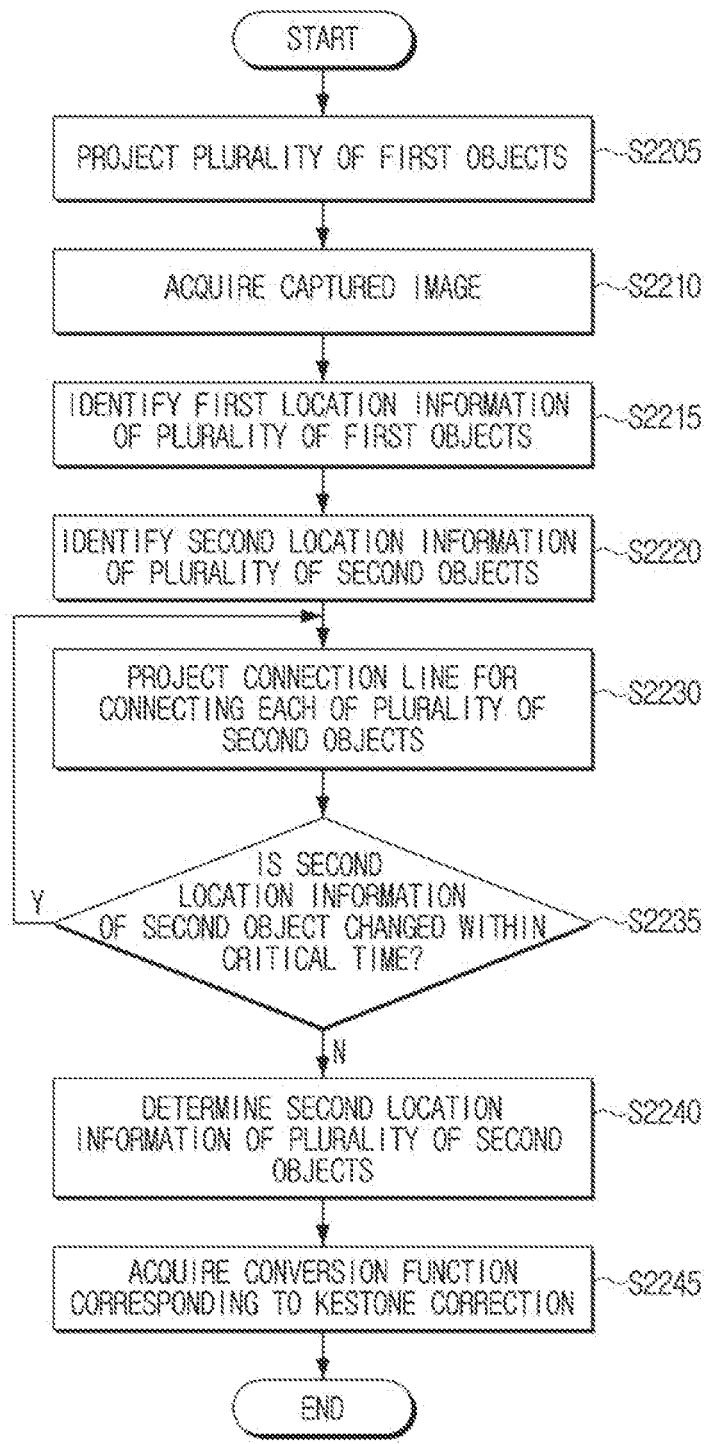
FIG. 22 is a diagram for describing an operation of checking whether the location of the second object is changed according to an embodiment of the disclosure.

FIG. 22 is a diagram for describing an operation of checking whether the location of the second object is changed.

Referring to FIG. 22, the projector 100 may project a plurality of first objects through the image projection unit 110 (S2205). In addition, the projector 100 may acquire the captured image by capturing the projected image through the camera 120 (S2210). In addition, the projector 100 may identify the first location information of the plurality of first objects in the captured image (S2215). In addition, the projector 100 may identify the second location information of the plurality of second objects in the captured image (S2220). In addition, the projector 100 may project a second connection line connecting each of the plurality of second objects (S2230). When the second connection line is projected, a user may adjust a location so that the second object becomes a rectangle based on the second connection line. Here, it may be a connection line 1222-5 of FIG. 12 of the connection line.

Meanwhile, the projector 100 may identify whether the second location information of the second object is changed within a critical time (S2235). When the second location information of the second object is changed within the critical time, steps S2230 and S2235 may be performed. Meanwhile, when the second location information of the second object is not changed within the critical time, the projector 100 may determine the second location information of the plurality of second objects (S2240). In addition, the projector 100 may acquire the conversion function corresponding to the keystone correction based on the first location information and the determined second location information (S2245).

Figure 23:
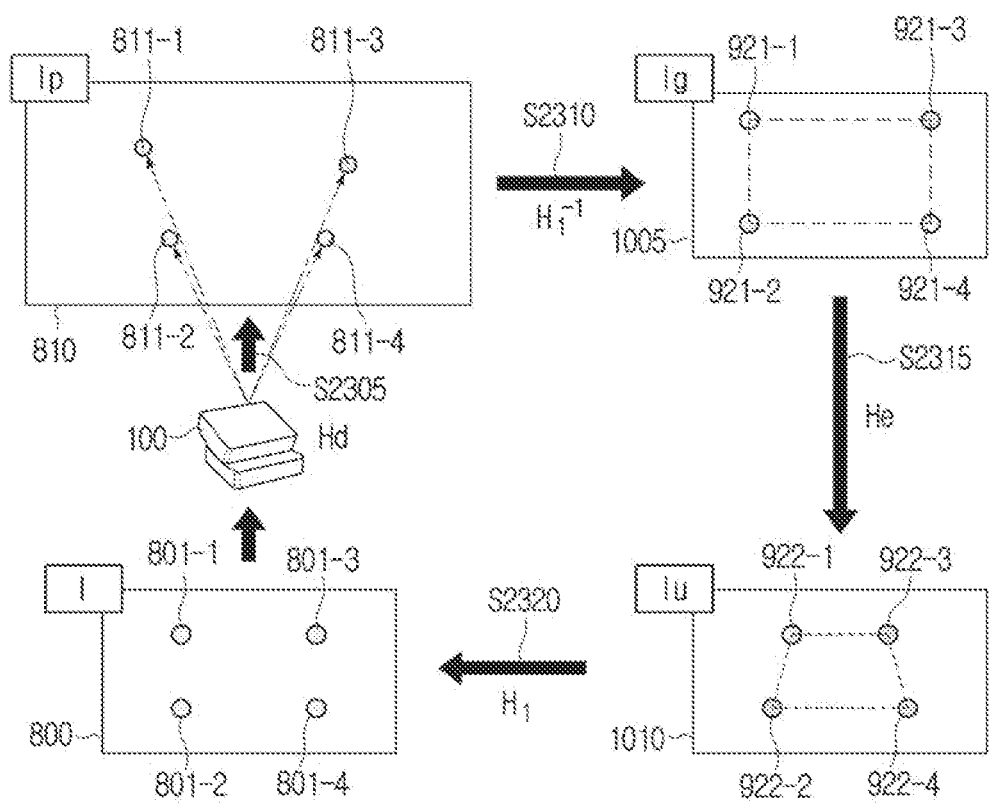
FIG. 23 is a diagram for describing an operation for acquiring a conversion function for keystone correction according to an embodiment of the disclosure.

FIG. 23 is a diagram for describing an operation for acquiring a conversion function for keystone correction.

Referring to FIG. 23, the projector 100 may project the input guide image 800 onto the target area through the image projection unit 110 (S2305). The projected image 810 may be distorted according to attributes of the image projection unit 110. The projector 100 may acquire the captured image by capturing the projected image 810 through the camera 120, and may identify the location information of the first object and the location information of the second object. In addition, the projector 100 may convert the captured image of the camera plane into the image of the project plane (S2310). Specifically, the projector 100 may acquire an image Ig of the project plane. In addition, the projector 100 may identify a conversion function He for converting the location information of the first object into the location information of the second object. In addition, the projector 100 may perform correction by applying He to the image Ig of the project plane (S2315). Here, when the conversion function H1 is applied to a corrected image Iu, it may be the same as an input image I (S2320). Here, since the conversion function H1 is a function used for plane movement, Iu may be a project plane image, and I may be a camera plane.

Equation 2301 may refer to a relationship between an input guide image 800 and a projected image 810. In Ip=Hd*I (2301), Ip may refer to a projected image. Hd may refer to a function for converting an image of an input information plane into an image of a projection area plane. In addition, Hd may refer to a function converted in a projection process through the image projection unit 110. Accordingly, when Hd is applied to the input image I, the image Ip of the camera plane may be acquired.

Equation 2302 may be an equation for converting the projected image Ip from the camera plane into the projector plane. Ig may refer to an image acquired by converting a guide image of a camera plane into a projector plane. Specifically, the projector 100 may acquire Ig by applying the inverse function $H1^{-1}$ of the conversion function H1 to Ip.

Equation 2303 is an expression for explaining the relationship between He and Hd. The image on which the keystone correction is performed may have a value similar to that of the image 1010 including only the second object. This is because the conversion function He for performing the keystone correction is acquired based on the image 1010 including only the second object.

Here, it is assumed that the input image I is similar to H1*Iu. Iu may refer to the image on which the keystone correction is performed, and may be the image 1010 including only the second object. Iu=He*Ig. Ig may be $H1^{-1}$*Ip. Accordingly, H1*Iu =H1*He*$H1^{-1}$*Ip=He*Ip. Here, Ip=Hd*I. Therefore, H1*Iu may be expressed as He*Hd*I. In addition, I may be similar to He*Hd*I. As a result, He may be similar to $(Hd)^{-1}$.

Figure 24:
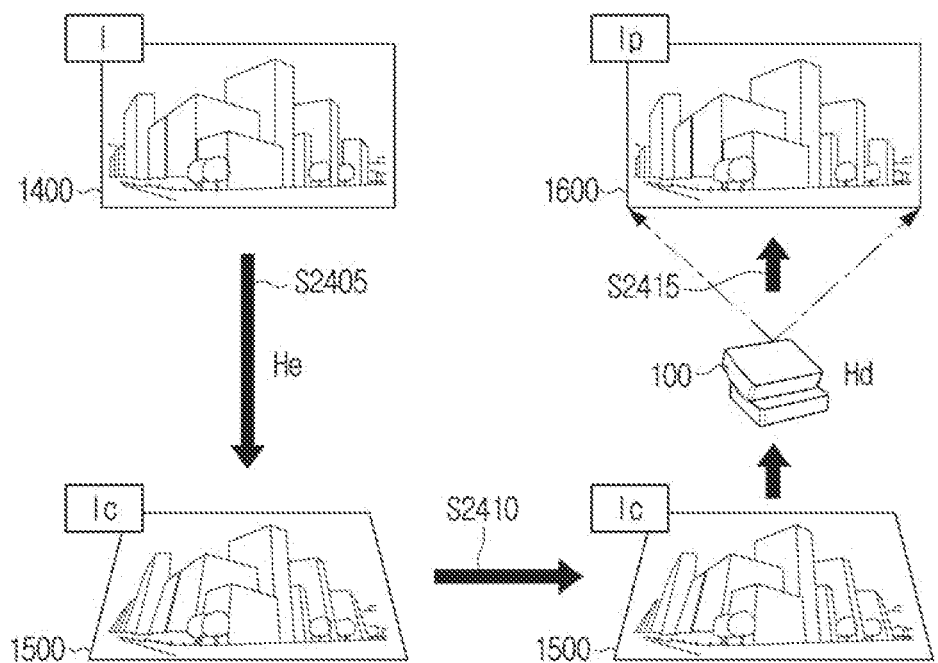
FIG. 24 is a diagram for describing an operation of projecting an image by performing keystone correction according to an embodiment of the disclosure.

FIG. 24 is a diagram for describing an operation of projecting an image by performing keystone correction.

Referring to FIG. 24, the projector 100 may acquire the corrected images 1500 (Ic) by performing the keystone correction on the input images 1400 (I) (S2405). In addition, the projector 100 may use the acquired corrected image 1500 as the output image (S2410). The projector 100 may project the output image through the image projection unit 110 (S2415). The projected image 1600 may be output without distortion in the same way as the input image.

Referring to Equation 2401, Ic=He*I. Here, Ic may refer to the corrected image 1500, I may refer to the input image 1400, and He may refer to a conversion function for keystone correction.

Referring to Equation 2402, Ip=Hd*Ic. Here, Ip is the projection image 1600, and Hd may refer to a function for converting the image of the input information plane into the image of the projection area plane. In addition, Hd may refer to a function converted in a projection process through the image projection unit 110. Here, Ic=He*I. As a result, Ip=Hd*(Hd)*I. In addition, He may be $(Hd^{-1})$ based on Equation 2303. Accordingly, Ip=Hd*$(Hd)^{-1}$*I=I. As a result, Ip=I.

As a result, when the keystone correction operation is performed according to the embodiment of the disclosure, the images 1600 (Ip) projected through the image projection unit 110 may be similar to the input images 1400 (I).

Figure 25:
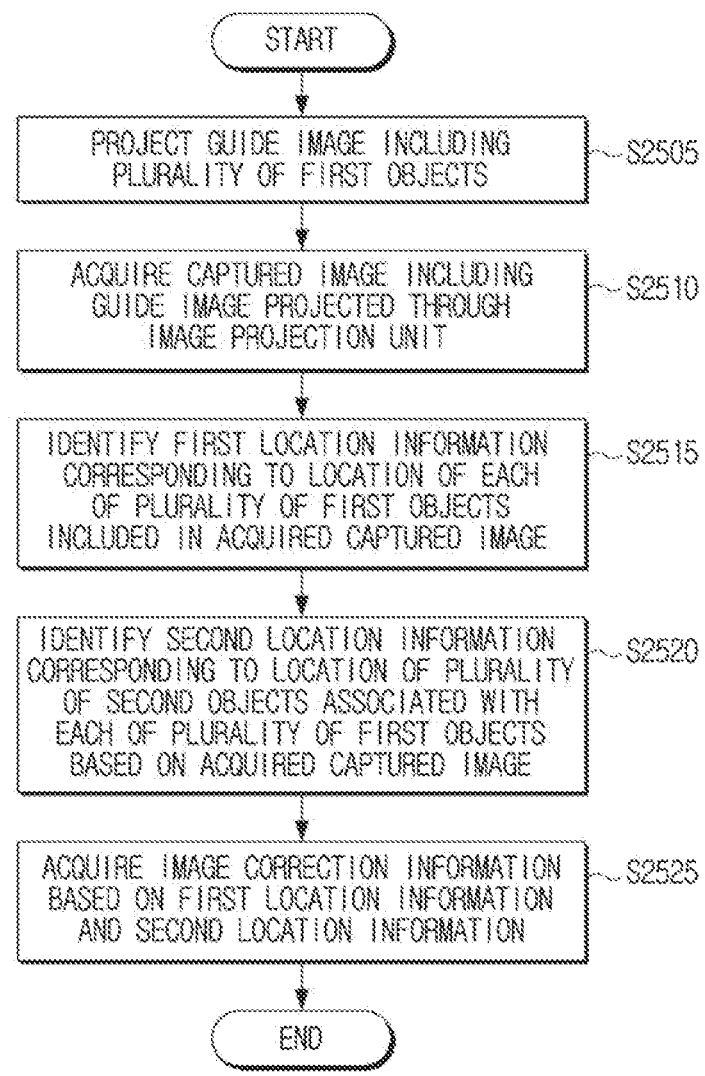
FIG. 25 is a flowchart illustrating a method of controlling a projector according to an embodiment.

FIG. 25 is a flowchart for describing a method of controlling a projector according to an embodiment.

Referring to FIG. 25, the method of controlling the projector 100 according to the embodiment of the disclosure may project a guide image including a plurality of first objects.

In addition, the control method may acquire a captured image including the projected guide image (S2510). In addition, the control method may identify the first location information corresponding to the locations of each of the plurality of first objects included in the acquired captured image (S2515).

In addition, the control method may identify the second location information corresponding to the locations of the plurality of second objects related to each of the plurality of first objects based on the acquired captured image (S2520).

In addition, the control method may acquire the image correction information based on the first location information and the second location information (S2525).

Meanwhile, the captured image may include the plurality of second objects, and in the identifying of the second location information (S2520), the second location information corresponding to the locations of the plurality of second objects included in the acquired captured image may be identified.

Meanwhile, in the identifying of the second location information (S2520), the locations of the plurality of second objects may be identified based on the first location information of each of the plurality of first objects, and the second location information may be identified based on the identified locations.

Meanwhile, the guide image may be an image related to a polygonal shape, and the plurality of first objects may be a plurality of point objects included in the image related to the polygonal shape.

The image correction information may include a conversion function for converting an input image into an output image, and the control method may further include converting the input image into the output image based on the conversion function and projecting the output image.

Meanwhile, the control method may further include correcting the captured image based on the degree of distortion of the captured image, and in the identifying of the first location information (S2515), the first location information may be identified based on the corrected captured image.

Meanwhile, the plurality of second objects may be objects corresponding to a part of a user's body, and in the identifying of the second location information (S2520), when the plurality of identified second objects in the acquired captured image are identified at the same location for a critical time or more, the identified location may be identified as the second location information.

Meanwhile, in the identifying of the second location information, when the first location information and the second location information are identified by the preset number in the captured image, the image correction information may be acquired based on the identified first location information and the identified second location information.

Meanwhile, when the preset number of second location information is not identified for a critical time in the captured image, the control method may further include projecting information guiding the preset number of second objects to be included in the captured image.

Meanwhile, the image projection unit may further include: outputting a signal corresponding to the guide image including the plurality of first objects through the light source lamp; and projecting the guide image based on the signal output from the light source lamp through the lens.

Meanwhile, the method of controlling the projector 100 as illustrated in FIG. 25 may be executed on the projector 100 having the configuration of FIG. 1 or 2, and may also be executed on the projector 100 having other configurations.

Meanwhile, the above-described methods according to various embodiments of the disclosure may be implemented in a form of application that may be installed in the existing electronic device.

In addition, the above-described methods according to various embodiments of the disclosure may be implemented only by software upgrade or hardware upgrade of the existing electronic device.

Further, various embodiments of the disclosure described above may also be performed through an embedded server included in the electronic device or an external server of at least one of the electronic device or the display device.

Meanwhile, according to an embodiment of the disclosure, various embodiments described above may be implemented by software including instructions stored in a machine-readable storage medium (for example, a computer-readable storage medium). A machine is a device capable of calling a stored instruction from a storage medium and operating according to the called instruction, and may include the electronic device of the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the above-described methods according to the diverse embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store, or a relay server or be temporarily generated.

In addition, each of components (for example, modules or programs) according to various embodiments described above may include a single entity or a plurality of entities, and some of the corresponding sub-components described above may be omitted or other sub-components may be further included in the diverse embodiments. Alternatively or additionally, some constituent elements (for example, a module or a program) may be integrated into a single entity to perform the same or similar functions performed by each corresponding constituent element prior to the integration. Operations performed by the modules, the programs, or the other components according to various embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A projector, comprising:
an image projection unit configured to project a guide image including a plurality of first objects;
a camera; and
a processor configured to:
obtain a captured image acquired by the camera, the captured image including the guide image projected through the image projection unit,
identify first location information corresponding to locations of each of the plurality of first objects included in the obtained captured image,
identify second location information, corresponding to locations of a plurality of second objects related to each of the locations of the plurality of first objects in the obtained captured image, useable for correction of an image to be projected through the image projection unit, and
acquire image correction information for the correction of the image to be projected through the image projection unit based on the first location information and the second location information.

2. The projector as claimed in claim 1, wherein the captured image includes the plurality of second objects, and
the processor identifies the second location information corresponding to the locations of the plurality of second objects included in the obtained captured image.

3. The projector as claimed in claim 1, wherein the processor identifies the locations of the plurality of second objects based on the first location information of each of the plurality of first objects, and identifies the second location information based on the identified locations.

4. The projector as claimed in claim 1, wherein the guide image is an image related to a polygonal shape, and
the plurality of first objects are a plurality of point objects included in the image related to the polygonal shape.

5. The projector as claimed in claim 1, wherein the image correction information includes a conversion function to convert an input image into an output image, and
the processor controls the image projection unit to convert the input image into the output image based on the conversion function and project the output image.

6. The projector as claimed in claim 1, wherein the processor corrects the captured image based on a degree of distortion of the captured image, and
identifies the first location information based on the corrected captured image.

7. The projector as claimed in claim 1, wherein the plurality of second objects are objects corresponding to a part of a user's body, and
the processor identifies the second location information corresponding to the locations of the plurality of second objects when the plurality of identified second objects in the obtained captured image are identified at a same location for equal to or greater than a critical time.

8. The projector as claimed in claim 1, wherein, when the first location information and the second location information are identified by a preset number in the captured image, the processor acquires the image correction information based on the identified first location information and the identified second location information.

9. The projector as claimed in claim 1, wherein, when a preset number of second location information is unidentified for a critical time in the captured image, the processor controls the image projection unit to project information guiding a preset number of second objects to be included in the captured image.

10. The projector as claimed in claim 1, wherein the image projection unit includes:
a light source lamp configured to output a signal corresponding to the guide image including the plurality of first objects; and
a lens configured to project the guide image based on the signal output from the light source lamp.

11. A method of controlling a projector, comprising:
projecting a guide image including a plurality of first objects;
obtaining a captured image including the projected guide image;
identifying first location information corresponding to locations of each of the plurality of first objects included in the obtained captured image;
identifying second location information, corresponding to locations of a plurality of second objects related to each of the locations of the plurality of first objects in the obtained captured image, useable for correction of an image to be projected; and
acquiring image correction information for the correction of the image to be projected through an image projection unit based on the first location information and the second location information.

12. The method as claimed in claim 11, wherein the captured image includes the plurality of second objects, and
in the identifying of the second location information, the second location information corresponding to the locations of the plurality of second objects included in the obtained captured image is identified.

13. The method as claimed in claim 11, wherein, in the identifying of the second location information, the locations of the plurality of second objects are identified based on the first location information of each of the plurality of first objects, and the second location information is identified based on the identified locations.

14. The method as claimed in claim 11, wherein the guide image is an image related to a polygonal shape, and
the plurality of first objects are a plurality of point objects included in the image related to the polygonal shape.

15. The method as claimed in claim 11, wherein the image correction information includes a conversion function to convert an input image into an output image, and
the method of controlling further comprises converting the input image into the output image based on the conversion function and projecting the output image.

* * * * *